US008020595B2

(12) United States Patent
Kiwaki et al.

(10) Patent No.: US 8,020,595 B2
(45) Date of Patent: Sep. 20, 2011

(54) PNEUMATIC TIRE WITH TREAD HAVING SIPES AND SHALLOW GROOVES

(75) Inventors: Yukihiro Kiwaki, Kodaira (JP); Ryoichi Watabe, Kodaira (JP); Kenichi Shibata, Kodaira (JP); Kazuyoshi Tagawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 1014 days.

(21) Appl. No.: 11/791,768

(22) PCT Filed: Nov. 30, 2005

(86) PCT No.: PCT/JP2005/021983
§ 371 (c)(1),
(2), (4) Date: Oct. 10, 2007

(87) PCT Pub. No.: WO2006/059640
PCT Pub. Date: Aug. 6, 2006

(65) Prior Publication Data
US 2008/0135150 A1 Jun. 12, 2008

(30) Foreign Application Priority Data

Nov. 30, 2004 (JP) .................................. 2004-345848
Nov. 30, 2004 (JP) .................................. 2004-345851
Nov. 30, 2004 (JP) .................................. 2004-345866

(51) Int. Cl.
*B60C 11/12* (2006.01)
(52) U.S. Cl. ........... 152/209.7; 152/209.15; 152/209.25; 152/209.28; 152/DIG. 3

(58) Field of Classification Search ............... 152/209.7, 152/209.15, 209.18, 209.25, 209.28, DIG. 3
See application file for complete search history.

(56) References Cited

U.S. PATENT DOCUMENTS

| 2,821,231 | A | * | 1/1958 | Kraft | 152/DIG. 3 |
| 5,385,189 | A | | 1/1995 | Aoki et al. | |
| 6,478,062 | B1 | * | 11/2002 | Schomburg | 152/DIG. 3 |
| 2005/0167022 | A1 | * | 8/2005 | Hashimoto | 152/DIG. 3 |
| 2006/0027296 | A1 | * | 2/2006 | Tsubono et al. | 152/DIG. 3 |
| 2006/0188593 | A1 | * | 8/2006 | Tanaka | 425/35 |
| 2010/0193096 | A1 | * | 8/2010 | Hashimoto | 152/209.18 |

FOREIGN PATENT DOCUMENTS

| EP | 1 625 950 A1 | 2/2006 |
| JP | 03-186403 | * 8/1991 |
| JP | 5-330319 A | 12/1993 |

(Continued)

OTHER PUBLICATIONS

Translation for Japan 07-186633 (no date).*

*Primary Examiner* — Steven D Maki
(74) *Attorney, Agent, or Firm* — Sughrue Mion, PLLC

(57) ABSTRACT

A plurality of shallow grooves which are shallower than a sipe are formed on land sections formed on treads of a pneumatic tire. The shallow grooves are configured so that a total sectional area of the shallow grooves per unit area in a cross section in a tire width direction in at least one of tread end areas arranged at end sides of the tread surface in the tire width direction or land end areas arranged at portions adjacent to a drain main groove on the land sections becomes larger than a total sectional area of the shallow grooves per unit on the other areas.

15 Claims, 23 Drawing Sheets

FOREIGN PATENT DOCUMENTS

| | | | |
|---|---|---|---|
| JP | 07-186633 | * | 7/1995 |
| JP | 7-186633 A | | 7/1995 |
| JP | 9-323511 A | | 12/1997 |
| JP | 2000-25421 A | | 1/2000 |
| JP | 2004-34902 A | | 2/2004 |
| JP | 2004-34903 A | | 2/2004 |
| JP | 2006-51873 A | | 2/2006 |
| WO | WO 2004/005051 A1 | | 1/2004 |

* cited by examiner

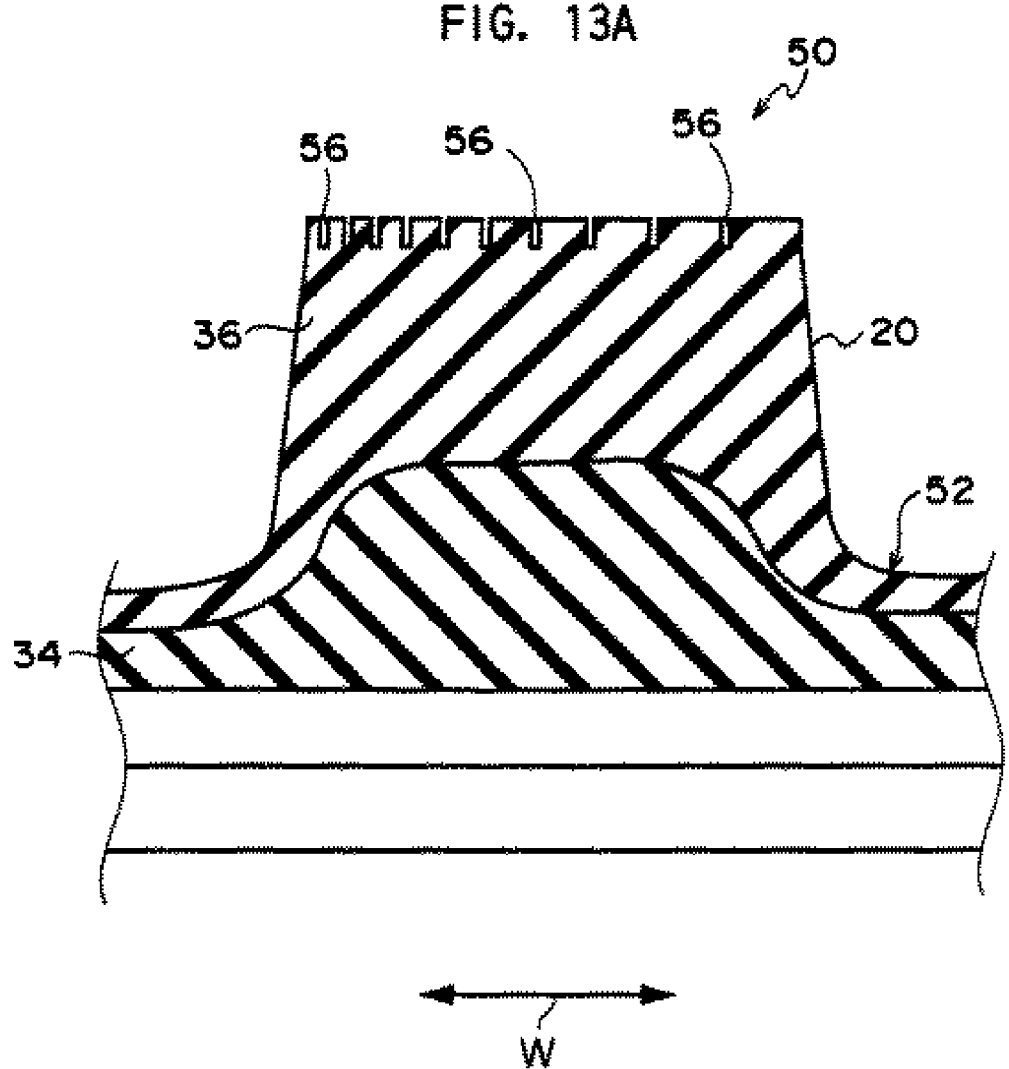

PNEUMATIC TIRE WITH TREAD HAVING SIPES AND SHALLOW GROOVES

TECHNICAL FIELD

The present invention relates to a pneumatic tire having a plurality of land sections divided by a plurality of circumferential grooves in a tread surface, and more specifically, relates to the pneumatic tire in which a performance in the early stage of use of tire is improved.

BACKGROUND ART

Tires in which a performance on a snow and ice road and a wet road is improved include winter tires. In some winter tires, various fillers are mixed so that an edge effect for an ice surface is obtained, and foam rubber is used so that a water absorption edge effect by means of a foam layer during the service period is obtained.

However, in general, when rubber is vulcanized and hardened, the filler and the foam layer are not exposed on a tire surface which directly contacts with a mold, and thus a membrane tends to be formed on the tire surface. As a result, in the early stage of use of tire, the effects of the filler and the foam layer are not exerted (or the effects are small).

On the contrary, for example, Patent Document 1 and Patent Document 2 describe pneumatic tires for snow and ice road in which thin grooves are formed in a tread surface so that braking and driving performances in the initial wear stage are improved. Patent Document 3 describes a pneumatic tire in which shallow grooves which form an angle of 0° to 40° with respect to a tire circumferential direction are arranged at ground land sections of the treads in the tire width direction.

Patent Document 1: Japanese Patent Application Laid-Open No. 2004-34902

Patent Document 2: Japanese Patent Application Laid-Open No. 2004-34903

Patent Document 3: Japanese Patent Application Laid-Open No. 7-186633

DISCLOSURE OF THE INVENTION

Problems to be Solved by the Invention

However, in an actual service condition of pneumatic tires, the further improvement of the performance in the early stage of use is required.

The above circumstance is taken into consideration, and it is an object of the present invention to provide a pneumatic tire in which the performance in the early stage of use is further improved.

Means for Solving the Problem

In order to solve the above problem, a pneumatic tire of a first aspect of the present invention comprising a plurality of land sections divided by a plurality of main grooves in a tread surface and in which the land sections are divided by at least one sipe extending in a tire width direction so that sub-blocks are formed, is that at least one of the plurality of main grooves is a drain main groove that is principally a drain groove, a plurality of shallow grooves which are shallower than the sipe are formed in the land sections, and a total sectional area of the shallow grooves per unit area in a cross section of the tire width direction, in at least one of tread end areas arranged at end sides of the tread surface in the tire width direction or land end areas adjacent to the drain main groove of the land sections, is larger than the total sectional area of the cross section of the shallow grooves per unit area in the other areas.

"The land sections" here include blocks and ribs divided by the main grooves. In this pneumatic tire, the main grooves, sipes and the shallow grooves are formed in the tread surface. Although forces of various strength and levels are applied to the pneumatic tire, an edge effect of the main grooves is exerted on a comparatively strong force, and an edge effect of the sipes is exerted on a comparatively weak force which causes only a deformation of the land sections, and an edge effect of the shallow grooves is exerted on a weaker force. A water absorption effect is also exerted mainly in the sipes and the shallow grooves. As a result, various forces can be received in a wider range, and a frictional force of the pneumatic tire can be effectively improved.

At least one of the main grooves of the pneumatic tire in this aspect is a drain main groove that is principally a drain groove. The drain main groove produces a main drainage effect in the main grooves. Normally, a ground pressure at the land sections adjacent to the drain main groove and near the tread ends is higher than that at the other portion. Therefore, when running on a snow road, a lot of water is discharged from these portions. In the present invention, the total sectional area of the shallow grooves per unit in the cross section of the tire width direction at tread end areas as ends of the tread in the tire width direction and land end areas as ends of the land sections adjacent to the drain main groove is made larger than a total sectional area of a cross section of the shallow grooves per unit area at the other areas. The number of drain main grooves may be singular or plural.

When block surfaces formed at the tread surface are connected by a continuous virtual surface, the sectional area of the shallow grooves is an area of a portion surrounded by the virtual surface and the shallow grooves.

When the tread ends and the shallow grooves formed near the drain main groove are configured in such a manner, a lot of water can be absorbed, so that a drainage effect can be improved.

The pneumatic tire of a second aspect of the present invention is that an average depth of the shallow grooves in at least one of the tread end areas or the land end areas is deeper than an average depth of the shallow grooves in the other areas in the pneumatic tire of the first aspect.

When the average depth of the shallow grooves formed in the tread ends and near the drain main groove is deepened, a lot of water can be absorbed, so that the drainage effect can be improved.

The pneumatic tire of the second aspect is that the drain main groove is a center circumferential groove formed along the tire circumferential direction at a center portion of the tread surface in the tire width direction, and the average depth of the shallow grooves is the same in the tread end areas and the land end areas which are arranged at both sides of the center circumferential groove.

When the center circumferential grooves are formed in the center of the tread surface, the average depth of the shallow grooves in the tread end areas and the land end areas is made the same, so that the drainage can be carried out in a balanced manner.

In the pneumatic tire of the second aspect, a difference between the average depth of the shallow grooves formed in the tread end areas and the land end areas, and the average depth of the shallow grooves formed in the other areas may be 0.1 mm to 0.4 mm.

From viewpoints of suppression of a deformation at the minute land sections and the drainage effect, the difference in the depths is preferably 0.1 mm to 0.4 mm.

The pneumatic tire of a third aspect is that an inclination angle of the shallow grooves with respect to the tire circumferential direction in at least one of the tread end areas or the land end areas is smaller than an inclination angle of the shallow grooves with respect to the tire circumferential direction in the other areas in the pneumatic tire of the first and second aspects.

The function of the shallow grooves includes the drainage effect and the edge effect, however, when the angle of inclination with respect to the tire circumferential direction is large, the edge effect increases, and when the angle of inclination with respect to the tire circumferential direction is small, the drainage effect increases.

The ground pressure at the land sections adjacent to the drain main groove and near the tread ends is higher than that at the other areas. Therefore, when running on a snow road, a lot of water is discharged from these portions. In the present invention, the angle of inclination of the shallow grooves formed in the tread end areas as ends of the tread in the tire width direction and the land end areas as ends of the land sections adjacent to the drain main groove with respect to the tire width direction is set to be smaller than the angle of inclination of the shallow grooves in the other areas with respect to the tire circumferential direction.

When the angle of inclination of the shallow grooves formed in the tread ends and near the drain main groove with respect to the tire circumferential direction is set to be smaller than the angle of inclination of the shallow grooves in the other areas with respect to the tire circumferential direction, the drainage effect can be improved.

Further, the angle of inclination of the shallow grooves in the other areas with respect to the tire circumferential direction is larger than that of the shallow grooves in the aforementioned areas. Therefore, the edge effect can be enhanced on the other areas.

The pneumatic tire of the third aspect can be configured so that the angle of inclination of the shallow grooves with respect to the tire circumferential direction increases gradually with distance from the tread ends of the tread surface, and from the drain main groove.

As being farther from the tread ends and the drain main groove, the angle of inclination is set to be larger. As a result, the drainage effect can be improved by means of a change in the angle of inclination without forming an abrupt performance change portion.

The pneumatic tire of the third aspect of the present invention can be configured so that a difference between the angle of inclination of the shallow grooves formed in the tread end areas and the land end areas with respect to the tire circumferential direction, and the angle of inclination of the shallow grooves formed in the other areas with respect to the tire circumferential direction is, 2° to 60°.

Taking the balance between the drainage property and the edge effect into consideration, it is preferable that a difference between the angle of inclination of the shallow grooves formed in the tread end areas and the land end areas with respect to the tire circumferential direction and the angle of inclination of the shallow grooves formed in the other areas with respect to the tire circumferential direction is 2° to 60°.

The pneumatic tire of a fourth aspect of the present invention is that a density of formation of the shallow grooves in at least one of the tread end areas or the land end areas is larger than a density of formation of the shallow grooves in the other areas in the pneumatic tire of the first to third aspects.

When the density of the shallow grooves formed in the tread ends and near the drain main groove is increased, a lot of water can be absorbed, thereby improving the drainage effect.

The pneumatic tire of the fourth aspect of the present invention can be configured so that the density of formation of the shallow grooves at a minimum in middle portions between the center circumferential grooves of the tread surface and both the tread ends, and increases gradually towards the tread ends and towards the center circumferential grooves.

When the density of formation of the shallow grooves is increased gradually towards the vicinity of the center circumferential grooves and tread ends, a gradual change in the performance can be made, and the drainage can be efficiently carried out.

The pneumatic tire of the fourth aspect of the present invention can be configured so that the drain main groove is a center circumferential groove formed along the tire circumferential direction in the center portion of the tread surface in the tire width direction, and the density of formation of the shallow grooves is the same in the tread end areas and in the land end areas arranged at both sides of the center circumferential groove.

When the center circumferential grooves are formed in the center of the tread surface, the density of the shallow grooves in the tread end areas and the land end areas are made the same, so that the drainage can be carried out in a balanced manner.

The pneumatic tire of the fourth aspect of the present invention is configured so that the shallow grooves are formed in a linear shape along the tire circumferential direction, and intervals between the shallow grooves in at least one of the tread end areas or the land end areas are smaller than intervals between forming the shallow grooves in the other areas.

When the shallow grooves are formed into a linear shape along the tire circumferential direction and the intervals between forming the shallow grooves are varied, the density of formation of the shallow grooves can be easily adjusted.

The pneumatic tire of the fourth aspect of the present invention can be configured so that the shallow grooves include a semicircular groove group which is configured by arranging a plurality of semicircular shallow grooves in the tire circumferential direction, the semicircular shallow grooves being formed on each half of the tread areas on both sides sandwiching the center circumferential groove, with a radius of ¼ of the tread width or greater and having an approximately semicircular shape with a convex portion in a tire rotating direction.

When the plurality of semicircular shallow grooves are arranged as described above, the density of the shallow grooves formed in the tread end areas and the land end areas can be easily made larger than the density of the shallow grooves formed in the other areas.

The approximately semicircular shape is an arc shape whose center angle is 120° to 180°.

A curvature radius of the semicircular shallow grooves is preferably 5 mm to 150 mm due to a relationship between the intervals between the drain main grooves and the ground width in the tire width direction.

In the pneumatic tire of the first to fourth aspects of the present invention, the shallow grooves preferably have a depth of 0.1 mm to 0.5 mm and a width of 0.1 mm to 1.0 mm.

When the depth of the shallow grooves is set to 0.5 mm or less, a deformation of the minute land sections divided by the shallow grooves at the time of grounding is suppressed, thereby reducing abrasion. Further, when the width of the shallow grooves is set to 1.0 mm or less, the area of the tread surface of the minute land sections is secured, so that the high performance can be obtained in the early stage of use.

When the depth and the width of the shallow grooves are set to 0.1 mm or more, the amount of water capable of being taken into the shallow grooves is secured, thereby obtaining the high water eliminating effect.

In the pneumatic tire of the first to fourth aspects of the present invention, a plurality of minute land sections divided by the plurality of shallow grooves preferably have a tread surface area of 0.4 mm$^2$ to 30 mm$^2$.

When the area of the tread surface of the minute land sections is set to 0.4 mm$^2$ or more, the ground area is secured, thereby obtaining the high performance in the early stage of use. When the tread surface area is limited to 30 mm$^2$ or less, the areas of the shallow grooves occupying a unit area (negative percentage) can be obtained. The amount of water capable of being taken into the shallow grooves is increased so that the high water eliminating effect can be obtained.

In the pneumatic tire of the first to fourth aspects of the present invention, rubber forming the land sections preferably includes a foam rubber layer on an outside in a tire radial direction and a non-foam rubber layer on an inside in the radial direction.

According to the pneumatic tire having the above configuration, when the ground surface is abraded by usage, the foam portion (foam layer) of the foam rubber layer is exposed. For this reason, the absorption effect of water generated between the foam portions and a road surface and the edge effect with respect to a road surface can be obtained. Even when the foam portions are not exposed in the early stage of use of the pneumatic tire, the plurality of shallow grooves formed in the land sections can produce the water absorption effect and the edge effect.

Further, the non-foam rubber layer in the side of the radial direction can stably maintain the shape of the land sections.

EFFECT OF THE INVENTION

The present invention provides a pneumatic tire in which the performance in the early stage of use is further improved.

BRIEF DESCRIPTION OF THE DRAWINGS

FIG. 13A is a cross-sectional view illustrating an enlarged block of the pneumatic tire according to the third exemplary embodiment of the present invention;

BEST MODE FOR CARRYING OUT THE INVENTION

A pneumatic tire according to exemplary embodiments of the present invention is described below.

First Exemplary Embodiment

Figure 1:
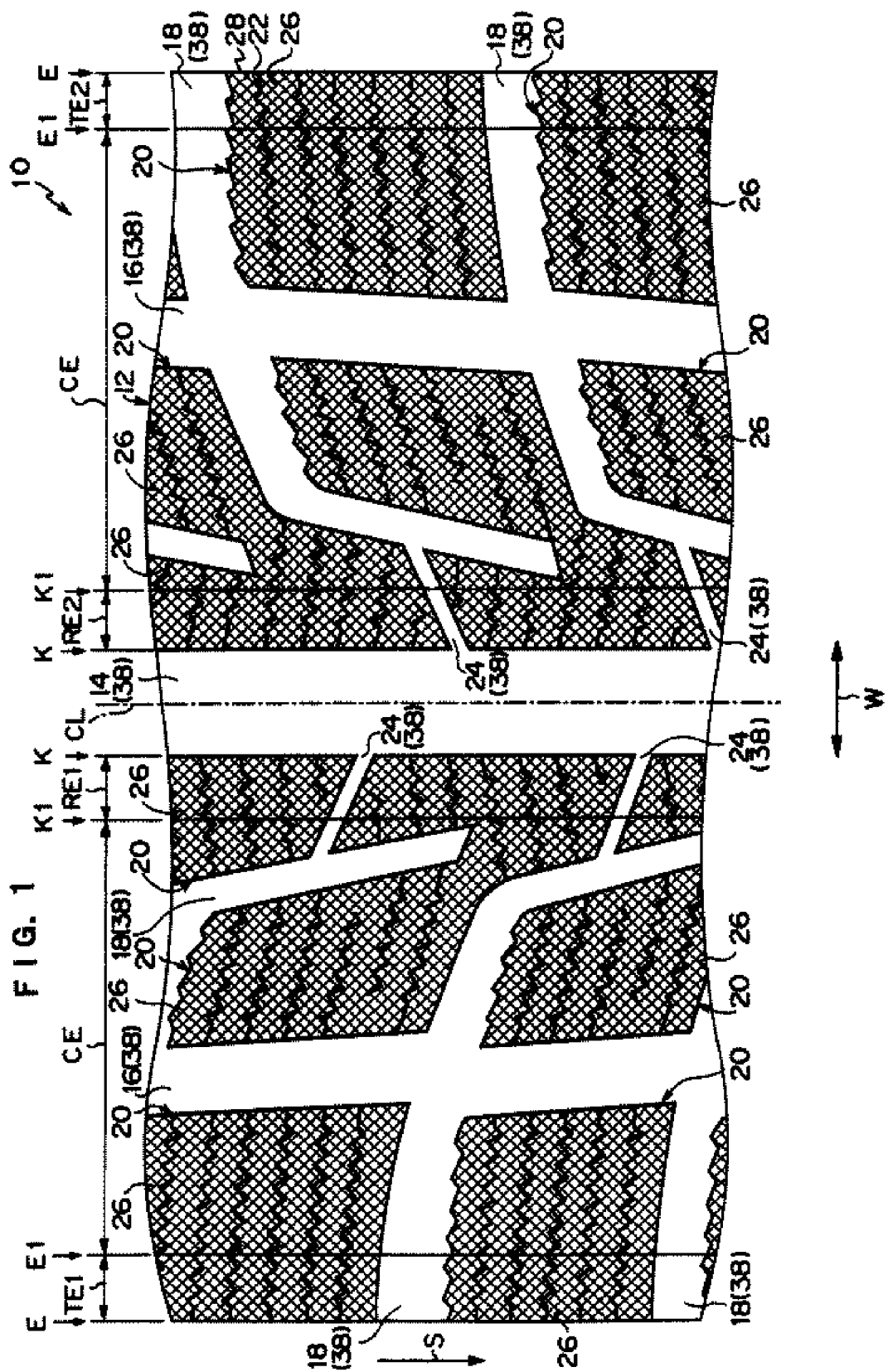
FIG. 1 is a plan view illustrating a tread of a pneumatic tire according to a first exemplary embodiment of the present invention.

FIG. 1 illustrates a pneumatic tire 10 according to a first exemplary embodiment of the present invention. A rotating direction of the pneumatic tire 10 is determined in advance. In the drawing, the rotating direction is shown by an arrow S, and a tire width direction perpendicular to the rotating direction is shown by an arrow W. A circumferential direction of the pneumatic tire 10 is the rotating direction and its opposite direction.

Figure 2A:
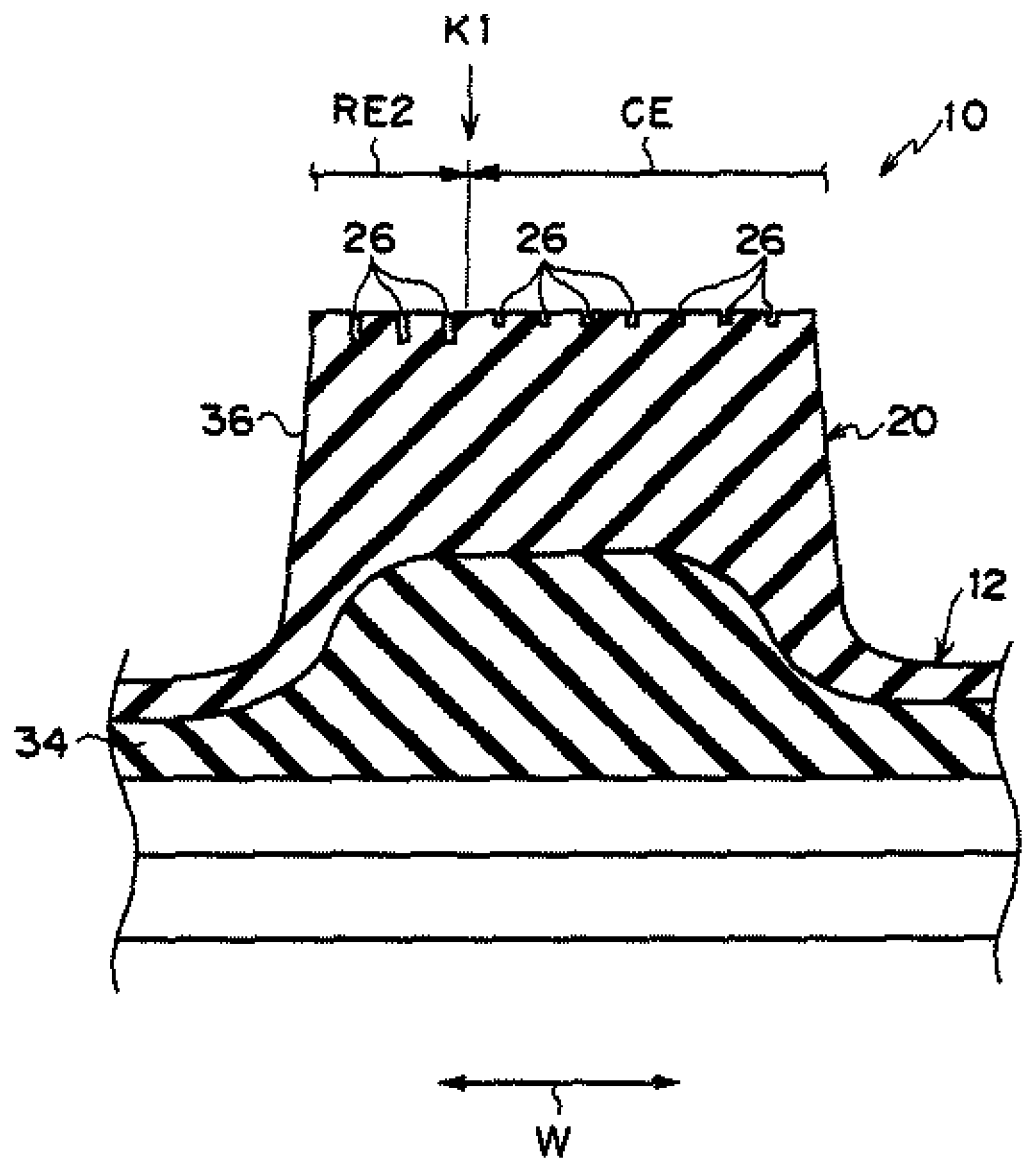
FIG. 2A is a cross-sectional view illustrating an enlarged block of the pneumatic tire according to the first exemplary embodiment of the present invention.

As shown in FIG. 2A, a tread 12 of the pneumatic tire 10 includes an inward rubber layer 34 on the inside in a tire radial direction and an outward rubber layer 36 on the outside in the tire radial direction.

The outward rubber layer 36 is a foam rubber layer in which a lot of air bubbles are present, and at the time of using the pneumatic tire 10, water between a tread surface and a road surface of the tread 12 is absorbed into air bubbles. An edge effect such that the tread surface is caught by the road surface due to the air bubbles is exerted. In general, in the early stage of use of the pneumatic tire 10, the air bubbles are not exposed on the tire surface (tread surface) which directly contacts with a mold for forming the tire.

On the contrary, the inward rubber layer 34 is a non-foam rubber layer in which such air bubbles are not present and its rigidity is higher than that of the outward rubber layer 36. As a result, the shape of the tread 12 can be stably maintained.

As shown in FIG. 1, in the tread 12 of the pneumatic tire 10, a linear drain main groove 14 is formed in a tire equator surface CL, and circumferential grooves 16 are formed on both sides of the tire width direction of the tire equator surface CL. The drain main groove 14 divides the tread 12 of the tire 10 into two in the tire circumferential direction so as to form two tread half areas. A lateral groove 18 which crosses the circumferential groove 16 is formed so as to curve from both the sides of the tire width direction of the pneumatic tire 10 towards the tire equator surface CL. Each of the lateral grooves 18 bends towards the rotating direction at a middle portion between each of the circumferential grooves 16 and the drain main groove 14, and a lateral groove 24 which is connected to the drain main groove 14 is formed from the approximately centers of longitudinal directions of the bent portions. The drain main groove 14, the circumferential grooves 16 and the lateral grooves 18 and 24 are main grooves 38 of the present invention, and the main grooves 38 divide the tread 12 of the pneumatic tire 10 into a plurality of blocks 20 (land sections).

The pneumatic tire 10 in the present exemplary embodiment is used as a winter tire, and tread rubber which forms the tread 12 has hardness (0° C., JIS-A) of 50°, loss coefficient tan δ (peak position) of −45° C., and dynamic elasticity (−20° C., 0.1% distortion) of 180 kgf/cm², however, the present invention is not limited thereto.

The tread rubber to be used as the winter tire preferably has hardness (0° C., JIS-A) of 40 to 68°, loss coefficient tan δ (peak position) of −30° C. or less and dynamic elasticity (−20° C., 0.1% distortion) of 300 kgf/cm² or less.

When the hardness of the tread rubber is less than 40°, it is too soft and has deteriorated wear resistance. When the hardness is higher than 68°, the tread rubber is too hard, its contact area with a snow and ice road surface decreases, and its braking performance and driving performance are deteriorated. For this reason, these cases are not preferable. When the loss coefficient tan δ (peak position) is higher than −30° C., the tread rubber is too rigid on the snow and ice road, the contact area decreases, and the braking performance and the driving performance are deteriorated. For this reason, this case is not preferable. When the dynamic elasticity is higher than 300 kgf/cm², the tread rubber is too hard on the snow and ice road, the contact area decreases, and the braking performance and the driving performance are deteriorated. For this reason, this case is not preferable.

On the other hand, as to the drain main groove 14, circumferential grooves 16, and the lateral grooves 18 and 24, their depth is preferably set to 8 mm or more and their width is set to 3 mm or more from viewpoints of drainage property and service life. A negative percentage of the tread 12 is preferably 25 to 65% from viewpoints of drainage property and rigidity of the blocks 20.

When the groove depth is less than 8 mm and the groove width is less than 3 mm, the drainage property by means of the grooves cannot be sufficiently exerted, and thus this case is not preferable. When the negative percentage is less than 25%, the drainage property is deteriorated, and thus this case is not preferable. When the negative percentage is higher than 65%, since the blocks 20 as the land sections become small and the rigidity is deteriorated, the braking performance and the driving performance are occasionally deteriorated, and the wear resistance is also deteriorated, which is not preferable.

Figure 3:
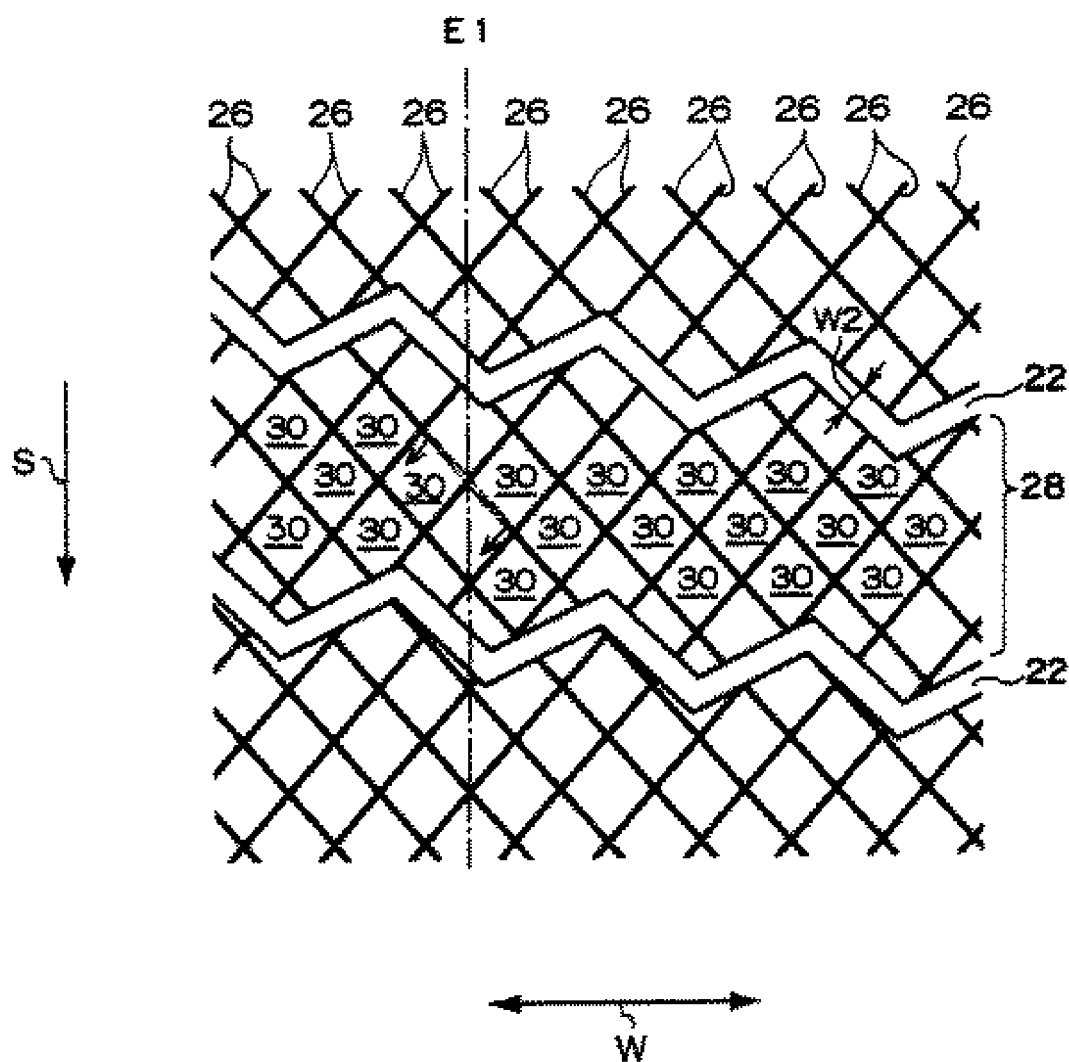
FIG. 3 is a plan view illustrating a partially enlarged portion of the tread of the pneumatic tire according to the first exemplary embodiment of the present invention.

Zig-zag-shaped sipes 22 which extend to the tire width direction (the direction of an arrow W) are formed in the tread surface of the blocks 20 as shown in FIG. 3. Each of the blocks 20 is divided into a plurality of sub-blocks 28 between the main grooves 38 and the sipes 22 or between the sipes 22.

Figure 2B:
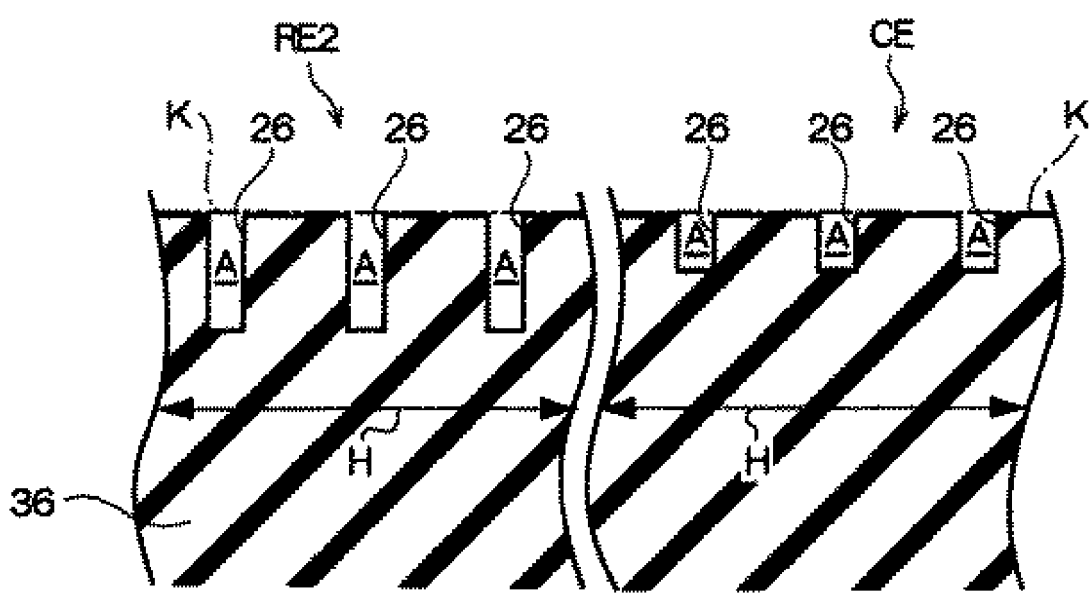
FIG. 2B is a cross-sectional view illustrating an enlarged shallow groove portion of the block of the pneumatic tire according to the first exemplary embodiment of the present invention.
Figure 4:
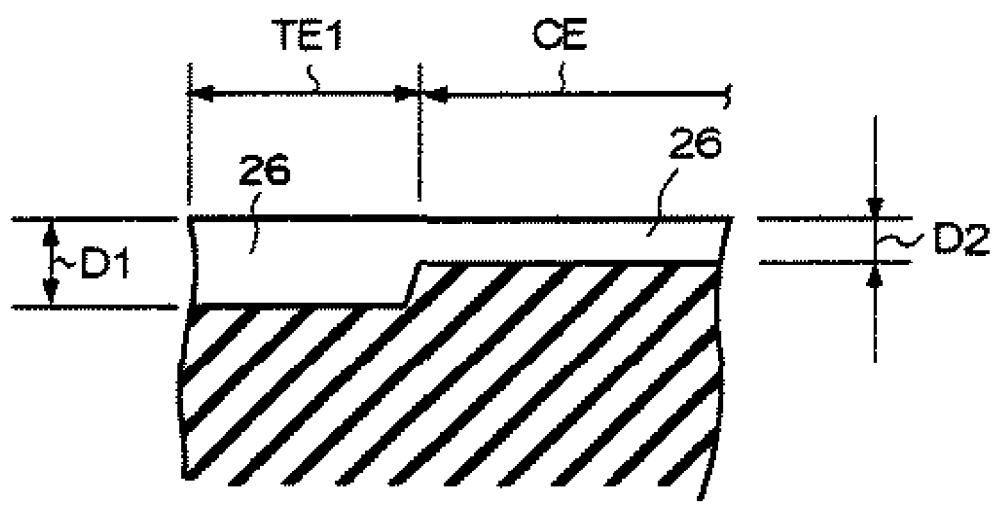
FIG. 4 is a cross-sectional view illustrating a depth change portion of the shallow grooves formed in the tread of the pneumatic tire according to the first exemplary embodiment of the present invention.

Shallow grooves 26 which absorb water generated between the tread surface and a road surface so as to be capable of eliminating or reducing a water film are provided in the tread surface of the blocks 20. The shallow grooves 26 in the present exemplary embodiment are formed into a mesh shape such that straight lines which incline 45° with respect to the circumferential direction of the tire 10 cross each other. The shallow grooves 26 divide the sub-blocks 28 into minute land sections 30. When the tread end of the pneumatic tire 10 is designated by E and a boundary portion between the drain main groove 14 and the block 20 is designated by K, the depth of the shallow grooves 26 changes abruptly on a vicinity of 15% width of the tread half area from the tread end E (this vicinity is a shallow groove change portion E1), and on a vicinity of 15% width of the block area from the boundary portion K (this portion is a shallow groove change portion K1) in each of the two tread half areas divided by the drain main groove 14. That is to say, a depth D1 of the shallow grooves 26 in tread end areas TE1 and TE2 positioned between the tread ends E and the shallow groove change portion E1 and the land end areas RE1 and RE2 positioned between the boundary portions K and the shallow groove change portion K1 becomes larger than a depth D2 of the shallow grooves 26 formed in the other areas (hereinafter, "center areas CE") as shown in FIGS. 2A and 4. As a result, as shown in FIG. 2B, a total area of a cross section A of the shallow grooves 26 per unit area H in a cross section of the tire width direction W in the case where the surfaces of the blocks 20 are connected by a continuous virtual surface K becomes larger in the tread end areas TE1 and TE2 and the land end areas RE1 and RE2 than that in the center areas CE.

The tread ends E are both the ground ends in the tire width W direction of the ground portion of the tire 10. The pneumatic tire is mounted to a standard rim regulated by JATMA YEAR BOOK (2004 edition, JATMA standards), and is filled with an inner pressure of 100% of air pressure (maximum air pressure) corresponding to maximum load facility (load of thick print in a related table between inner pressure and load facility) in applied size/ply rating of JATMA YEAR BOOK, and the maximum load facility is used as a load.

When the TRA standards and the ETRTO standards are applied at the time of use or manufacturing, the use and manufacturing come into compliance with the respective standards.

The tread end areas TE1 and TE2 may fall within a range of a width of 10 mm or more from the tread ends E to a width of within ⅙ of the tread width (a distance from one tread end E to the other tread end E). Similarly, the land end areas RE1 and RE2 may fall within a range of a width of 10 mm or more from the boundary portions K with the drain main groove 14 to a width of within ⅙ of the tread width.

Figure 5:
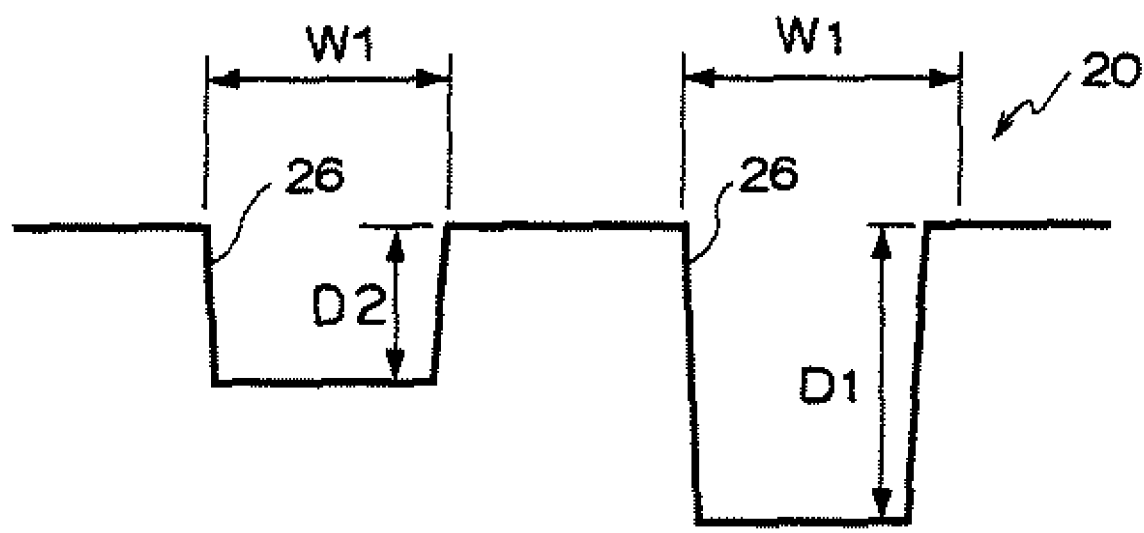
FIG. 5 is an explanatory diagram illustrating a depth and a width of the shallow grooves formed in the tread of the pneumatic tire according to the first exemplary embodiment of the present invention.

As shown in FIG. 5, a width W1 of the shallow grooves 26 is at least narrower than a width W2 of the sipes 22 (see FIG. 3), however, these width may be equivalent or W1 is wider than W2. The width W1 of the shallow grooves 26 is preferably within a range of 0.1 mm to 1.0 mm. When the width W1 is 1.0 mm or less, a deformation at the time of ground of the minute land sections 30 is suppressed, thereby reducing abrasion.

As shown in FIG. 5, the shallow grooves 26 have an approximately rectangular cross section, and their depth is preferably within a range of 0.1 mm to 0.5 mm. When the depth D1 and the width W1 are 0.1 mm or more, the amount of water capable of being taken into the shallow grooves 26 is secured, so that a high water eliminating effect can be obtained. When the depth D1 is 0.5 mm or less and the width W1 is 1.0 mm or less, the deformation at the time of grounding of the minute land sections 30 is suppressed, thereby reducing abrasion.

Further, a difference between the depth D1 of the shallow grooves 26 in the tread end areas TE1 and TE2 and the land end areas RE1 and RE2 and the depth D2 of the shallow grooves 26 in the center areas CE is preferably within a range of 0.1 mm to 0.4 mm.

The tread surface area of the minute land sections 30 is preferably set to 0.4 $mm^2$ to 30 $mm^2$. When the area of the tread surface is set to 0.4 $mm^2$ or more, the ground area is secured, so that the high performance in the early stage of use of the pneumatic tire 10 can be obtained. When the area of the tread surface is limited to 30 $mm^2$ or less, the amount of water capable of being taken into the shallow grooves 26 can be secured, thereby obtaining the high water eliminating effect.

The shallow grooves 26 can be formed in the inner surface of a mold for vulcanizing and molding the pneumatic tire 10 by cutting work, electrical discharging, etching work and the like.

The shallow grooves 26 can be formed also on molded tires or tires whose surfaces are abraded to a certain extent due to running, and the grooves 26 can be formed on such tires by surface buff and the like using knife cutting or sandpaper.

The function of the pneumatic tire 10 in the present exemplary embodiment is described below.

The tread 12 of the pneumatic tire 10 includes the inward rubber layer 34 on the inside in the tire radial direction (non-foam rubber layer) and the outward rubber layer 36 on the outside in the tire radial direction (foam rubber layer), however, the air bubbles of the outward rubber layer 36 are not exposed from the tread surface in the early stage of use.

When a vehicle with the pneumatic tires 10 in the early stage of use runs on a snow and ice road, water is generated due to a pressure at the time of contact or friction and the like between the tread 12 and ice or snow. The water which causes a deterioration of the frictional force is taken into the shallow grooves 26 provided to the tread surface of the blocks 20 and is drained via these grooves (or further, via the sipes 22) to the drain main groove 14, the circumferential grooves 16 and the lateral grooves 18 and 24. For this reason, the water film between the tread surfaces and the road is eliminated.

For this reason, in the pneumatic tire 10 of the present exemplary embodiment, the braking performance and driving performance on the snow and ice road in the early stage of use are further improved than tires where the shallow grooves 26 are not formed in the tread surface. Simultaneously, the wet performance is improved by the drainage effect of the shallow grooves 26 also on wet roads.

Particularly in the present exemplary embodiment, the depth of the shallow grooves 26 formed in the tread end areas TE1 and TE2 near the tread ends E of the center portions CE and the land end areas RE1 and RE2 adjacent to the drain main groove 14 is larger than the depth of the shallow grooves 26 formed in the center areas CE. Normally, a grounding pressure at the land sections adjacent to the drain main groove 14 and near the tread ends E is higher than that in the other portions. When the vehicle runs on a snow road, therefore, a lot of water discharges from these portions. Therefore, when the average depth of the shallow grooves 26 formed in the tread end areas TE1 and TE2 and the land end areas RE1 and RE2 is increased, a lot of water can be absorbed, thereby improving the drainage effect efficiently.

In the present exemplary embodiment, the depth D1 of the shallow grooves 26 formed in the tread end areas TE1 and TE2 and the land end areas RE1 and RE2 is made uniform, and the depth D2 of the shallow grooves 26 formed in the center areas CE is also made uniform, however, they do not have to be always uniform. The average depth of the shallow grooves 26 formed in the tread end areas TE1 and TE2 and the land end areas RE1 and RE2 may be larger than the average depth of the shallow grooves formed in the center areas CE.

Figure 6:
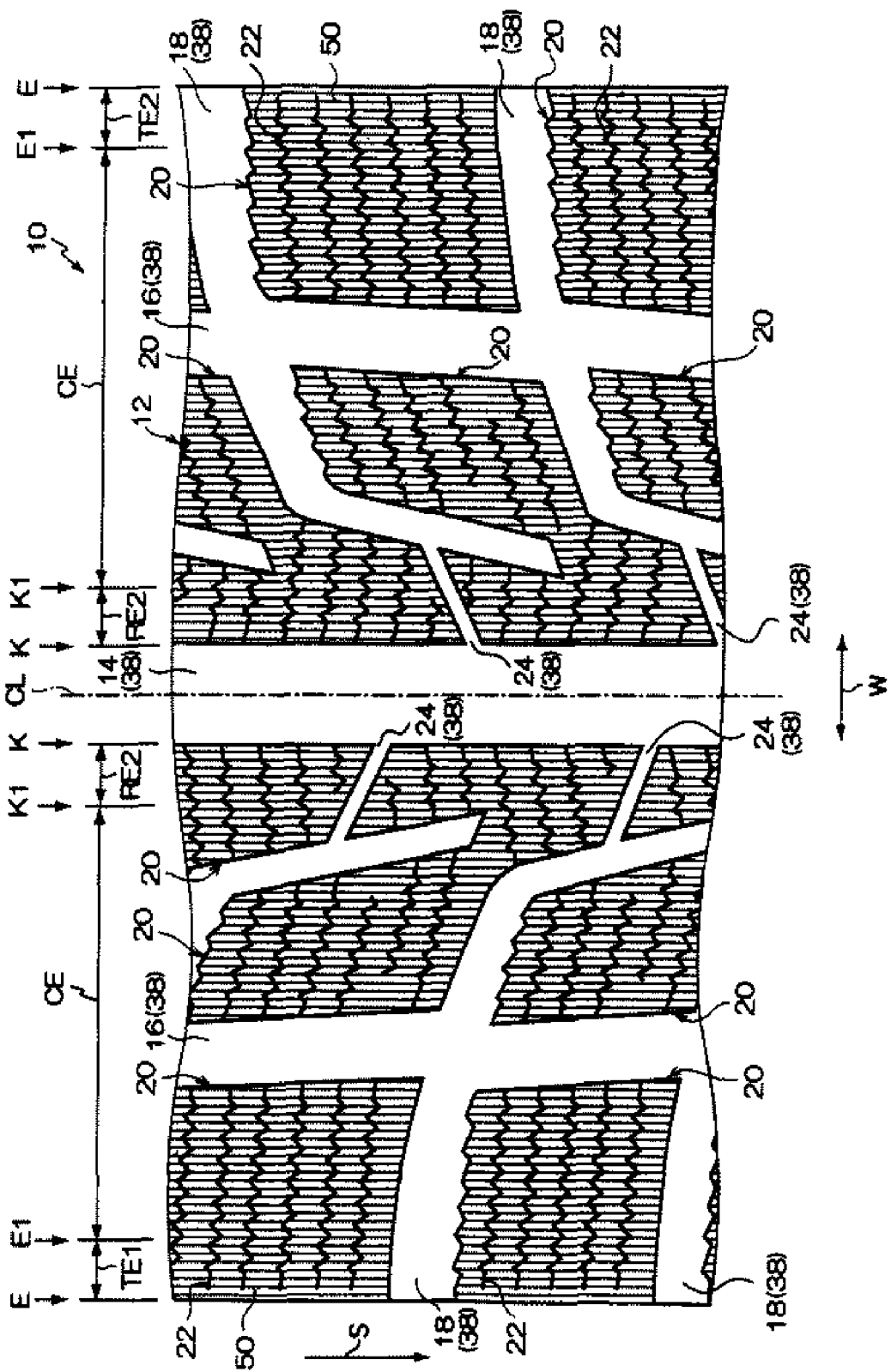
FIG. 6 is a plan view illustrating a modified example of the tread of the pneumatic tire according to the first exemplary embodiment of the present invention.

The shallow grooves according to the present invention are not limited to the mesh-shaped shallow grooves 26, and as shown in FIG. 6, linear shallow grooves 50 which extend to the circumferential direction may be formed. In this case, a depth D3 of the shallow grooves 50 formed in the tread end areas TE1 and TE2 and the land end areas RE1 and RE2 may be increased, and a depth D4 of the shallow grooves 50 formed in the center areas CE may be smaller than D3.

The shallow grooves do not have to be always arranged in a regular pattern like this present exemplary embodiment, however, when the pattern is regular, the configuration becomes simple, and the entire tread surface can preferably obtain uniform performance.

The present exemplary embodiment exemplifies the pneumatic tire 10 in which sipes 22 are formed in the blocks 20, however, the present invention can be applied to pneumatic tires which are not formed with the sipes 22, and the shallow grooves 26 can be formed in the blocks 20. In this case, when the shallow grooves are at least made shallower and narrower than the drain main grooves 14 and 16 and the lateral grooves 18 and 24, the influence of the shallow grooves 26 to be exerted on the basic performance of the pneumatic tire can be reduced, and the water eliminating effect which is the original effect of the shallow grooves 26 can be maintained.

Not only the pneumatic tire 10 where the blocks 20 are formed by the main grooves 38, however, also pneumatic tires where ribs, for example, are formed can be the pneumatic tire of the present invention by forming the shallow grooves in the ribs.

The blocks 20 (or ribs) may be formed by rubber which is filled with filler in order to improve an on-ice performance instead of the outward rubber layer composed of the foam rubber layer. With such a configuration, it is assumed that the filler is not exposed from the tread surface of the pneumatic tire in the early stage of use, however, when the shallow grooves of the present exemplary embodiment are formed, the performance of the pneumatic tire in the early stage of use can be improved.

Second Exemplary Embodiment

A second exemplary embodiment of the present invention is described below. In the present exemplary embodiment, the same portions are designated by the same reference numerals of the first exemplary embodiment, and the description thereof is omitted.

Figure 7:
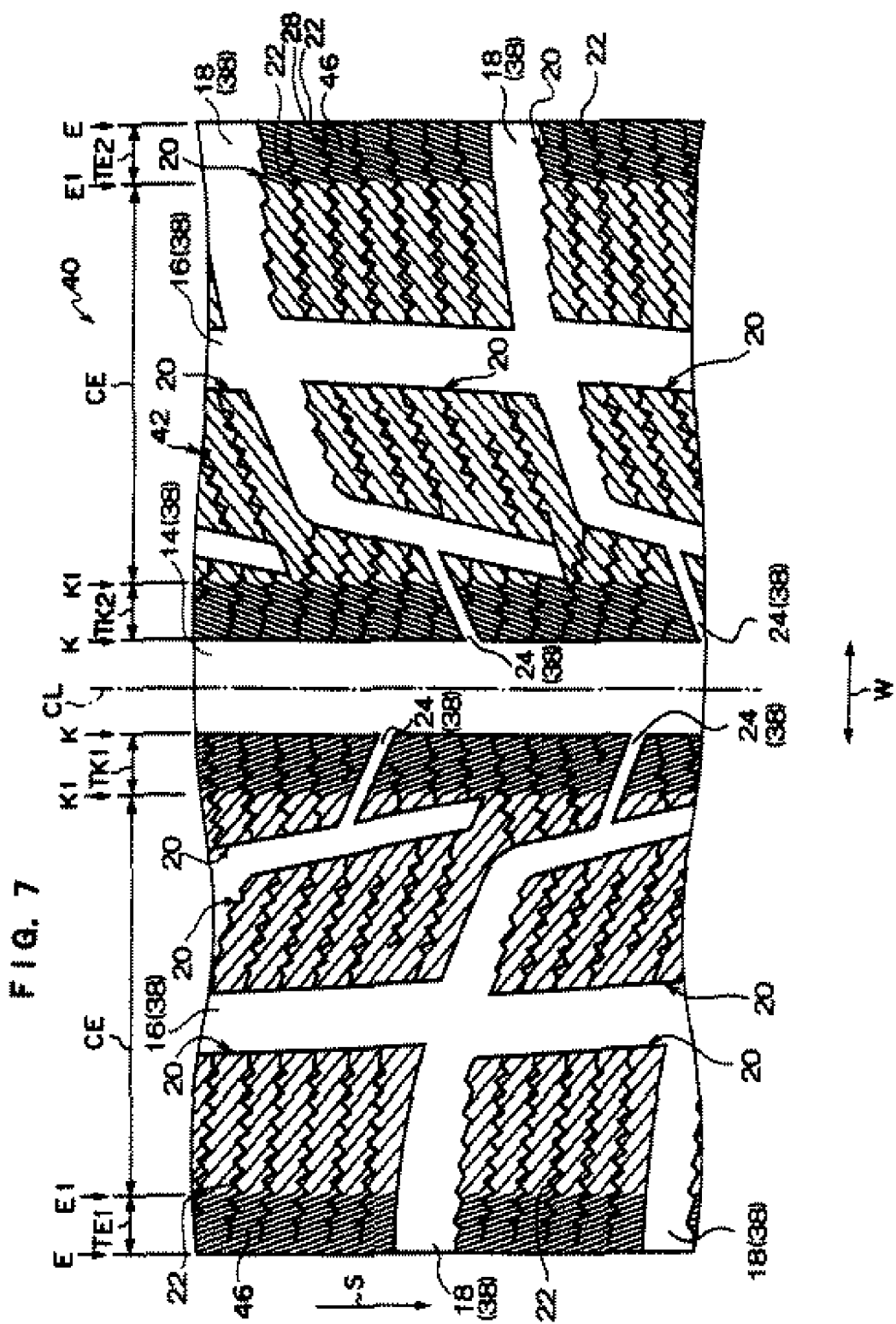
FIG. 7 is a plan view illustrating the tread of the pneumatic tire according to a second exemplary embodiment of the present invention.

FIG. 7 illustrates a pneumatic tire 40 according to the second exemplary embodiment of the present invention. The rotating direction of the pneumatic tire 40 is determined in advance similarly to the pneumatic tire 10 described in the first exemplary embodiment. In this drawing, the rotating direction is shown by an arrow S, and a tire width direction perpendicular to the rotating direction is shown by an arrow W. The circumferential direction of the pneumatic tire 40 is the rotating direction and opposite direction to the rotating direction.

Figure 8A:
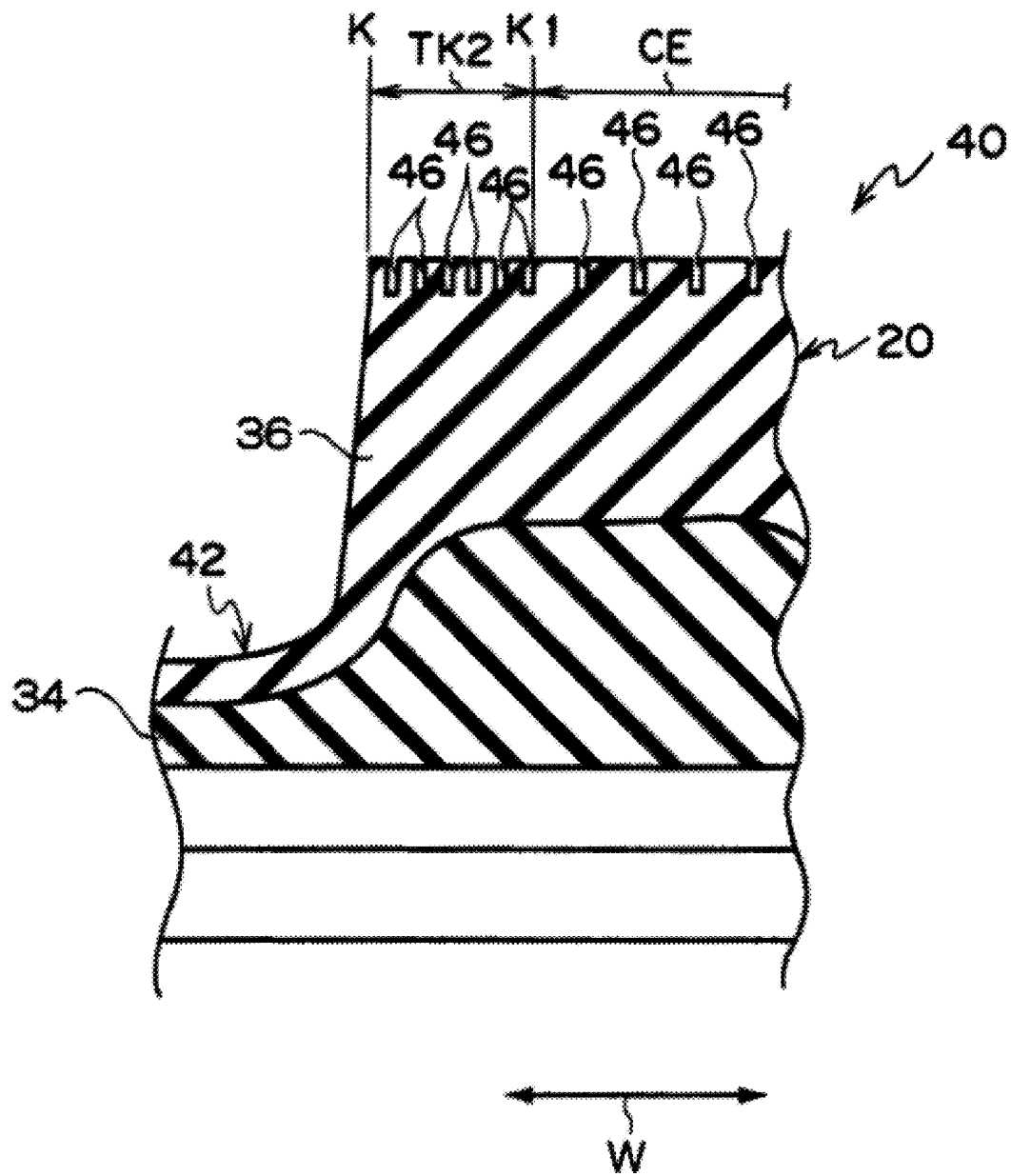
FIG. 8A is a sectional view illustrating an enlarged block of the pneumatic tire according to the second exemplary embodiment of the present invention.

As shown in FIG. 8A, a tread 42 of the pneumatic tire 40 includes the inward rubber layer 34 on the inside in the tire radial direction and the outward rubber layer 36 on the outside in the tire radial direction. The configurations of the outward rubber layer 36 and the inward rubber layer 34 are similar to those in the first exemplary embodiment. The configurations of the drain main grooves 14, circumferential grooves 16, the lateral grooves 18 and 24 and the blocks 20 are similar to those in the first exemplary embodiment (see FIG. 7).

The pneumatic tire 40 in the present exemplary embodiment is used as a winter tire, and in tread rubber forming the tread 42, the hardness (0° C., JIS-A), the loss coefficient tan δ (peak position) and the dynamic elasticity (−20° C., 0.1% distortion) are similar to those in the first exemplary embodiment, however, the present invention is not limited to this.

The depth and the width of the drain main grooves 14, the circumferential grooves 16 and the lateral grooves 18 and 24 are preferably 8 mm or more and 3 mm or more, respectively, from viewpoints of the drainage property and service life. The negative percentage of the surface of the tread 42 is preferably 25 to 65% from viewpoints of drainage property and rigidity of the blocks 20.

When the groove depth is less than 8 mm and the groove width is less than 3 mm, the drainage property due to the grooves cannot be sufficiently obtained. When the negative percentage is less than 25%, the drainage property is deteriorated, which is not preferable. When the negative percentage becomes higher than 65%, the blocks 20 as the land sections become small so that the rigidity is deteriorated. For this reason, the braking performance and the driving performance are occasionally deteriorated, and an antiwear performance is also deteriorated, which is not preferable.

Figure 9:
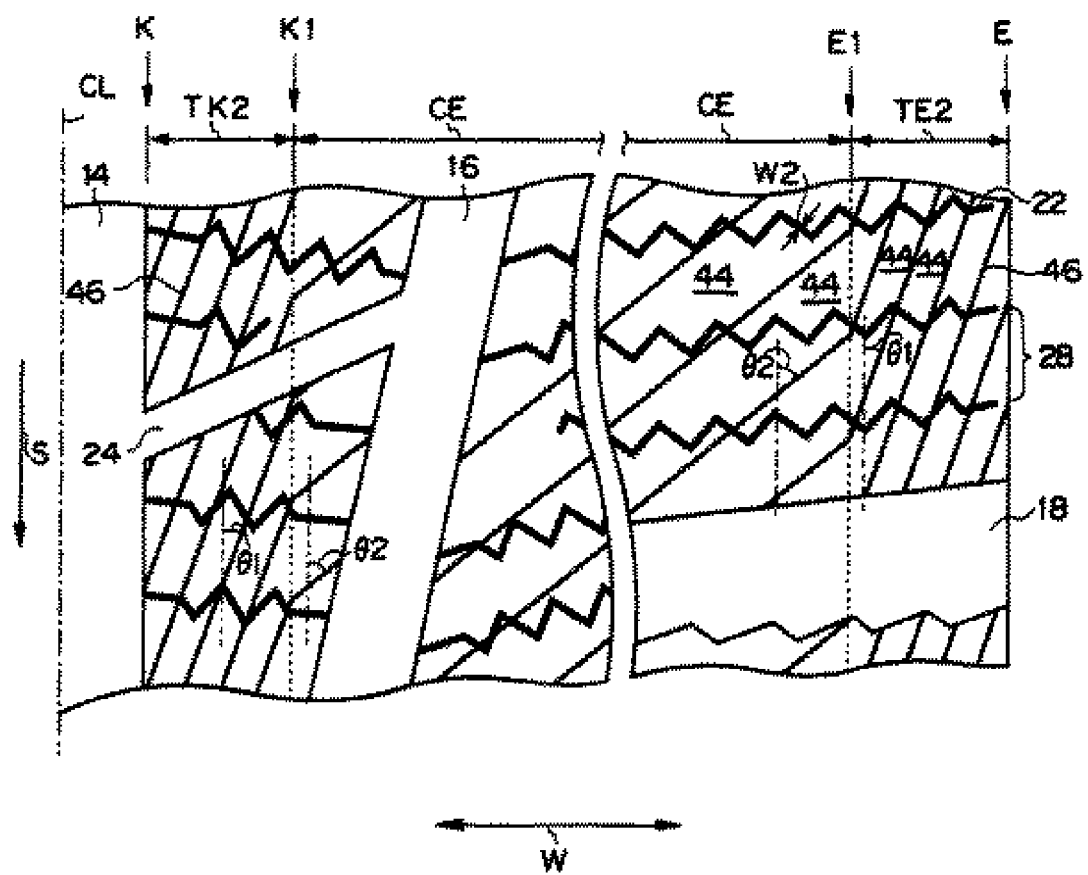
FIG. 9 is a plan view illustrating an enlarged portion of the tread of the pneumatic tire according to the second exemplary embodiment of the present invention.

As shown in FIG. 9, zig-zag-shaped sipes 22 which extend in the tire width direction (the direction of the arrow W) are provided onto the tread surface of the blocks 20, and each of the blocks 20 is divided into a plurality of sub-blocks 28 between the main grooves 38 and the sipes 22 or between the sipes 22.

Figure 8B:
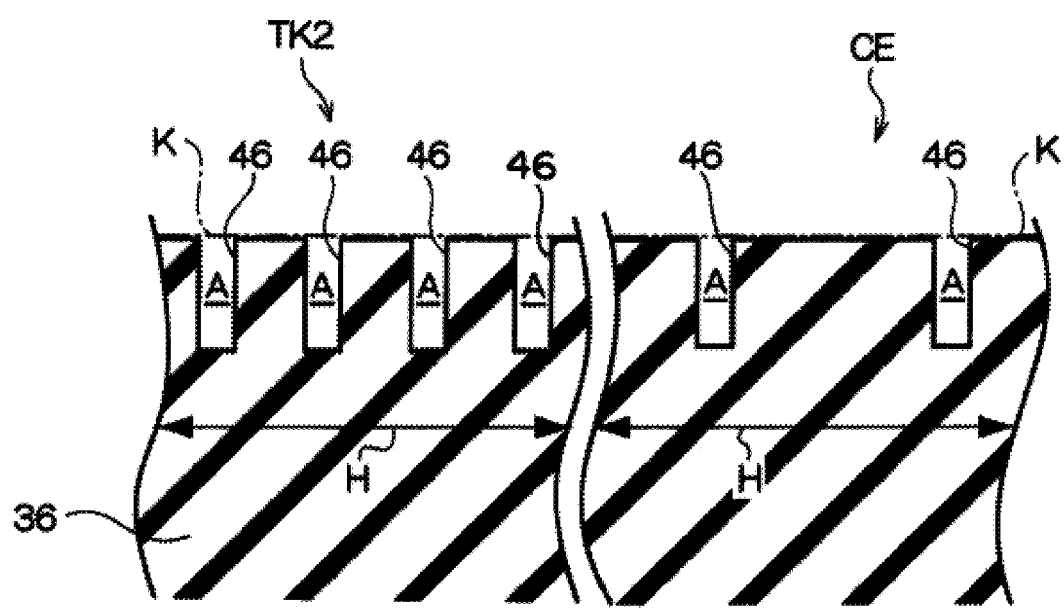
FIG. 8B is a sectional view illustrating an enlarged shallow groove portion in the block of the pneumatic tire according to the second exemplary embodiment of the present invention.

Shallow grooves 46 which absorb water generated between the tread surface and the road surface so as to be capable of eliminating or reduce a water film are provided in the tread surface of the blocks 20. The shallow grooves 46 in the present exemplary embodiment are formed from the drain main grooves 14 towards the tread ends E in a direction where they incline to a rear side of the rotating direction. The shallow grooves 46 divide the sub-blocks 28 into minute land sections 44. When the tread ends of the pneumatic tire 40 are designated by E and the boundary portions between the drain main grooves 14 and the blocks 20 are designated by K, an angle of the shallow grooves 46 with respect to the tire circumferential direction changes on a vicinity of 15% width of the block area from the tread ends E (this vicinity is a shallow groove change portion E1), and on a vicinity of 15% width of the block area from the boundary portion K (this portion is a shallow change portion K1) in each of the two block areas divided by the drain main groove 14. In the present exemplary embodiment, an angle of the shallow grooves 46 in the tread end areas TE1 and TE2 positioned between the tread ends E and the shallow groove change portion E1 and the land end areas RE1 and RE2 positioned between the boundary portion K and the shallow groove change portion K1 with respect to the tire circumferential direction is designated by θ1, and an angle of the shallow grooves 46 formed in the other areas (hereinafter "center areas CE") with respect to the tire circumferential direction is designated by θ2. Here, θ2 is larger than θ1. As a result, as shown in FIG. 8B, a total area of the cross section A of the shallow grooves 46 per unit area H in the cross section in the tire width direction W in the case where the surfaces of the blocks 20 are connected by a continuous virtual surface K is larger at the tread end areas TE1 and TE2 and the land end areas RE1 and RE2 than that at the center areas CE.

The positions of the tread ends E and the ranges of the tread end areas TE1 and TE2 are similar to those in the first exemplary embodiment.

A difference between the angles θ1 and θ2 is preferably 2° to 60°.

Figure 10:
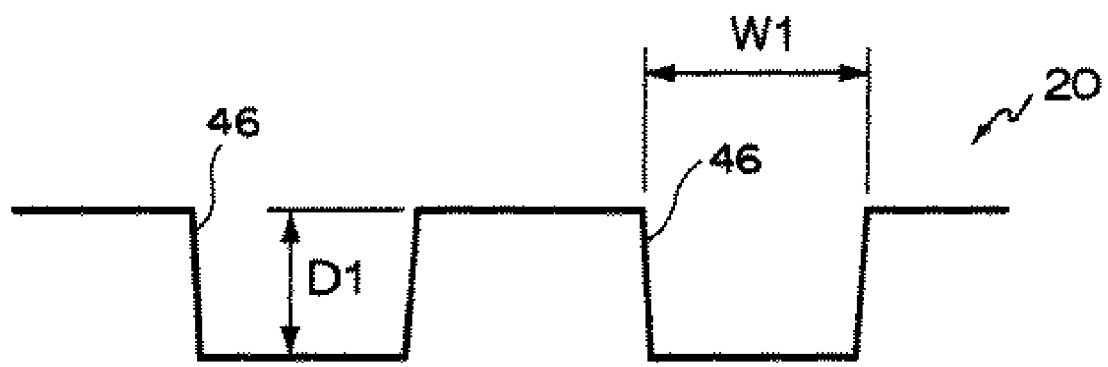
FIG. 10 is an explanatory diagram illustrating a depth and a width of the shallow grooves formed in the tread of the pneumatic tire according to the second exemplary embodiment of the present invention.

As shown in FIG. 10, the width W1 of the shallow grooves 46 is at least narrower than the width W2 (see FIG. 9) of the sipe 22, however, these widths may be equivalent or W1 is wider than W2. The width W1 of the shallow grooves 46 is preferably within a range of 0.1 mm to 1.0 mm. When the width W1 is 1.0 mm or less, a deformation of the minute land sections 44 at the time of grounding is suppressed, and abrasion can be reduced.

As shown in FIG. 10, the shallow grooves 46 have an approximately rectangular cross section, and the depth is preferably within a range of 0.1 mm to 0.5 mm. When the depth D1 and the width W1 are 0.1 mm or more, the amount of water capable of being taken into the shallow grooves 26 is secured, thereby obtaining the high water eliminating effect. When the depth D1 is set to 0.5 mm or less and the width W1 is set to 1.0 mm or less, a deformation of the minute land sections 44 at the time of grounding is suppressed, and abrasion can be reduced.

The area of the tread surface of the minute land section 44 is preferably 0.4 $mm^2$ to 30 $mm^2$. When the area of the tread surface is 0.4 $mm^2$ or more, the grounding area is secured, the high performance of the pneumatic tire 10 can be obtained in the early stage of use. When the grounding area is limited to 30 $mm^2$ or less, the amount of water capable of being taken into the shallow grooves 46 is secured, thereby obtaining the high water eliminating effect.

The shallow grooves 46 can be formed in the inner surface of a mold for vulcanizing and molding the pneumatic tire 40 by cutting work, electrical discharging, etching work and the like.

The shallow grooves 46 can be formed also on molded tires or tires whose surfaces are abraded to a certain extent due to running, and the grooves 46 can be formed on such tires by surface buff and the like using knife cutting or sandpaper.

The function of the pneumatic tire 40 according to the present exemplary embodiment is described below.

The tread 12 of the pneumatic tire 40 includes the inward rubber layer 34 on the inside in the tire radial direction (non-foam rubber layer) and the outward rubber layer 36 on the outside in the tire radial direction (foam rubber layer), however, the air bubbles of the outward rubber layer 36 are not exposed from the tread surface in the early stage of use.

When a vehicle with the pneumatic tires 40 in the early stage of use runs on a snow and ice road, water is generated due to a pressure at the time of contact or friction between the tread 42 and ice or snow. The water which causes a deterioration of the frictional force is taken into the shallow grooves 46 provided to the tread surface of the blocks 20 and is drained via these grooves (or further, the sipes 22) to the drain main groove 14, the circumferential grooves 16 and the lateral grooves 18 and 24. For this reason, the water film between the tread surface and the road is eliminated.

For this reason, in the pneumatic tire 40 of the present exemplary embodiment, the braking performance and driving performance on the snow and ice road in the early stage of use are further improved than tires where the shallow grooves 46 are not formed in the tread surface. Simultaneously, the wet performance is improved by the drainage effect of the shallow grooves 46 also on wet roads.

Particularly in the present exemplary embodiment, the angle θ1 of the shallow grooves 46 formed in the tread end areas TE1 and TE2 near the tread ends E and the land end areas RE1 and RE2 adjacent to the drain main groove 14 with respect to the tire circumferential direction is smaller than the angle θ2 of the shallow grooves 46 formed in the center areas CE with respect to the tire circumferential direction. Therefore, the water absorbed by the shallow grooves 46 can be efficiently drained to the outside of the tread ends E and to the drain main groove 14, thereby improving the drainage property.

Further, the angle θ2 of the shallow grooves 46 formed in the center areas CE with respect to the tire circumferential direction becomes larger than the angle θ1 of the shallow grooves 46 formed in the tread end areas TE1 and TE2 and the land end areas RE1 and RE2 with respect to the tire circumferential direction. Therefore, the edge effect can be efficiently exerted.

Figure 11:
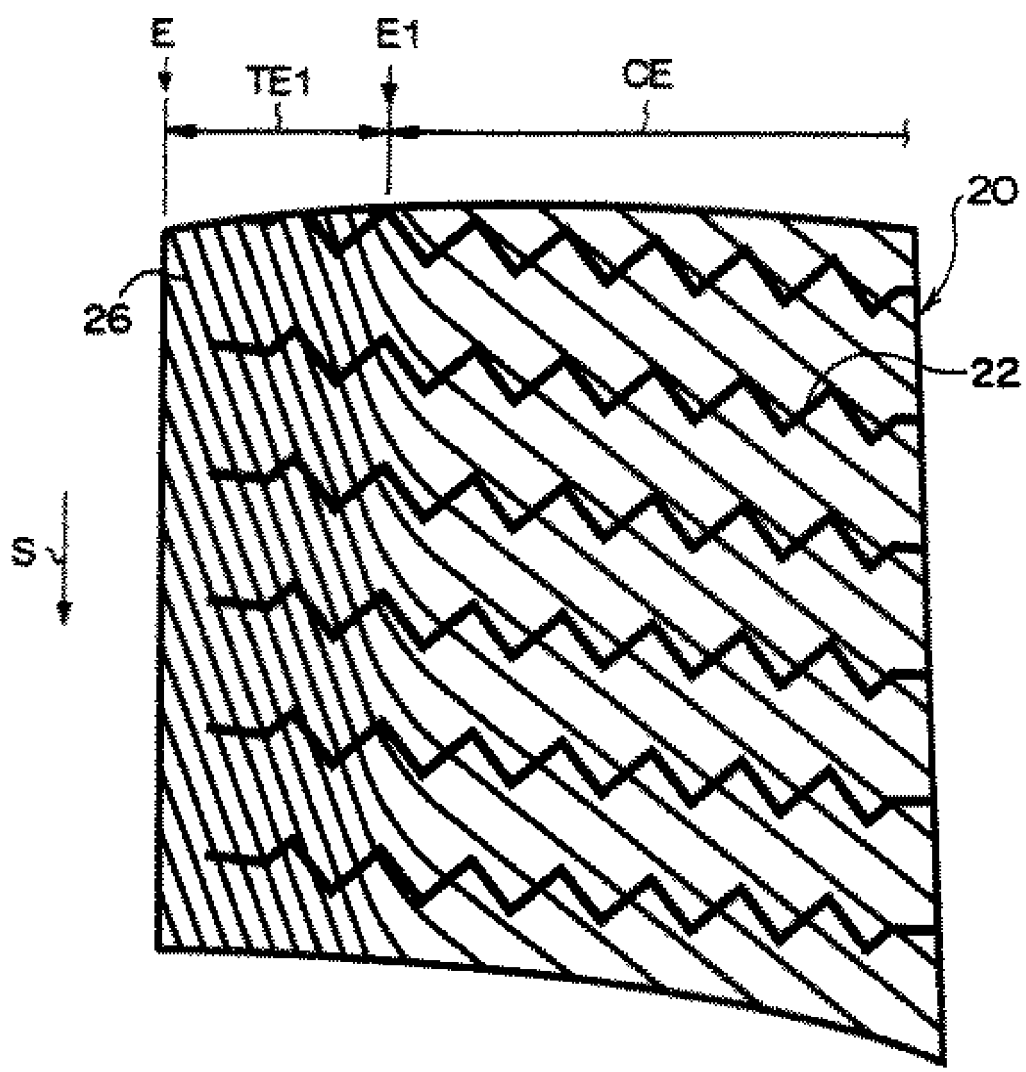
FIG. 11 is a plan view illustrating a modified example of the tread of the pneumatic tire according to the second exemplary embodiment of the present invention.

In the present exemplary embodiment, the shallow grooves 46 are linear, the angle θ1 is constant and the angle θ2 is constant, however, the shallow grooves 46 do not have to be always linear. As shown in FIG. 11, corner portions of the shallow grooves 46 are eliminated near the shallow groove change portion E1 and near the shallow groove change portion K1, so that the shallow grooves 46 may be formed into a curved line shape. With such a shape, the gradual performance change can be made.

The angle of the shallow grooves 46 with respect to the tire circumferential direction may be the biggest on a mid portion between the tread ends E and the boundary portions K, and be gradually smaller towards the drain main groove 14 and the tread ends E.

The shallow grooves do not have to be always arranged in a regular pattern like the present exemplary embodiment, however, when the pattern is regular, the configuration becomes simple, and the uniform performance can be preferably obtained at the entire tread surface.

The present exemplary embodiment describes the pneumatic tire 10 where the sipes 22 are formed in the blocks 20, however, the present invention can be applied to pneumatic tires where the sipes 22 are not formed, and the shallow grooves 46 can be formed in the blocks 20. In this case, the shallow grooves are made shallower and narrower than the drain main grooves 14 and 16 and the lateral grooves 18 and 24, As a result, the influence of the shallow grooves 46 to be exerted on the basic performance of the pneumatic tire can be reduced, and the water eliminating effect which is an original effect of the shallow grooves 46 can be maintained.

Not only the pneumatic tire 40 where the blocks 20 are formed by the main grooves 38, however, also pneumatic tires where, for example, ribs are formed may be the pneumatic tire of the present invention by forming the shallow grooves in the ribs.

The blocks 20 (or ribs) may be formed by rubber which is filled with filler in order to improve an on-ice performance instead of the outward rubber layer composed of the foam rubber layer. With such a configuration, it is assumed that the filler is not exposed from the tread surface of the pneumatic tire in the early stage of use, however, when the shallow grooves of the present exemplary embodiment are formed, the performance of the pneumatic tire in the early stage of use can be improved.

In the present exemplary embodiment, only the angle of the shallow grooves 46 is changed at the tread end areas TE1 and TE2 and the land end areas RE1 and RE2 and the center areas CE, however, as described in the first exemplary embodiment, the depth of the shallow grooves may be also changed.

Third Exemplary Embodiment

A third exemplary embodiment of the present invention is described below. In the present exemplary embodiment, the same portions are designated by the same reference numerals in the first and the second exemplary embodiments, and description thereof is omitted.

Figure 12:
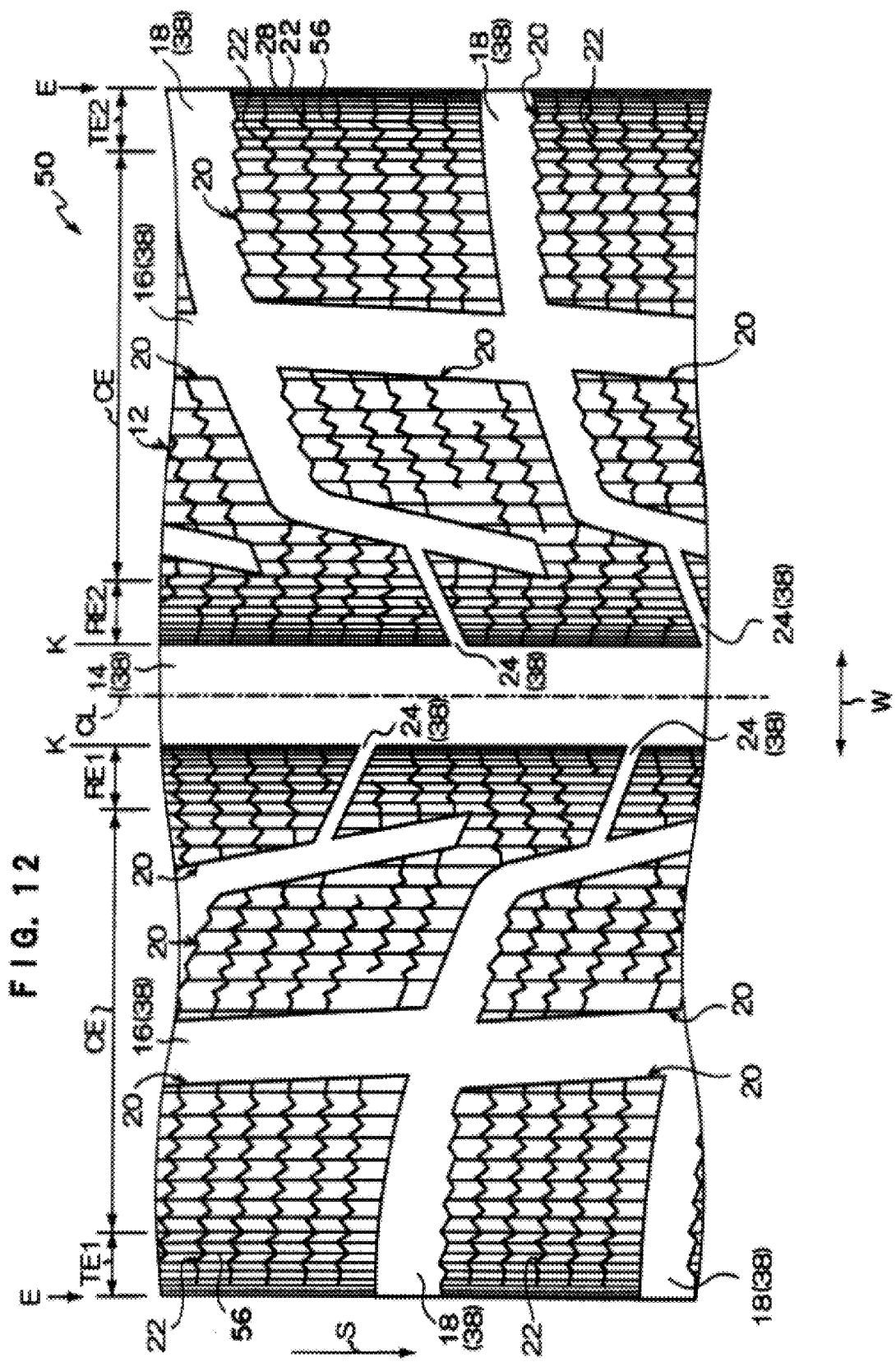
FIG. 12 is a plan view illustrating a tread of the pneumatic tire according to a third exemplary embodiment of the present invention.

FIG. 12 illustrates a pneumatic tire 50 according to the third exemplary embodiment of the present invention. The rotating direction of the pneumatic tire 50 is determined in advance similarly to the pneumatic tire 10 described in the first exemplary embodiment. In the drawing, the rotating direction is shown by an arrow S, and the tire width direction perpendicular to the rotating direction is shown by an arrow W. The circumferential direction of the pneumatic tire 10 is the rotating direction and the opposite direction to it.

As shown in FIG. 13A, the tread 52 of the pneumatic tire 50 includes the inward rubber layer 34 on the inside in the tire radial direction and the outward rubber layer 36 on the outside in the tire radial direction. The configurations of the outward rubber layer 36 and the inward rubber layer 34 are similar to those in the first exemplary embodiment. The configurations of the drain main groove 14, the circumferential grooves 16, the lateral grooves 18 and 24 and the blocks 20 are similar to those in the first exemplary embodiment (see FIG. 12).

The pneumatic tire 50 in the present exemplary embodiment is used as a winter tire, and in tread rubber forming the tread 52, the hardness (0° C., JIS-A), the loss coefficient tan δ (peak position) and the dynamic elasticity (−20° C., 0.1% distortion) are similar to those in the first exemplary embodiment, however, the present invention is not limited thereto.

The depth and the width of the drain main groove 14, the circumferential grooves 16 and the lateral grooves 18 and 24 are preferably 8 mm or more and 3 mm or more, respectively, from viewpoints of the drainage property and service life. The negative percentage of the tread surface of the tread 52 is preferably 25 to 65% from viewpoints of drainage property and rigidity of the blocks 20.

When the groove depth is less than 8 mm and the groove width is less than 3 mm, the drainage property due to the grooves cannot be sufficiently obtained. When the negative percentage is less than 25%, the drainage property is deteriorated, which is not preferable. When the negative percentage becomes higher than 65%, the blocks 20 as the land sections become small so that the rigidity is deteriorated. For this reason, the braking performance and the driving performance are occasionally deteriorated, and the antiwear performance is also deteriorated, which is not preferable.

Figure 14:
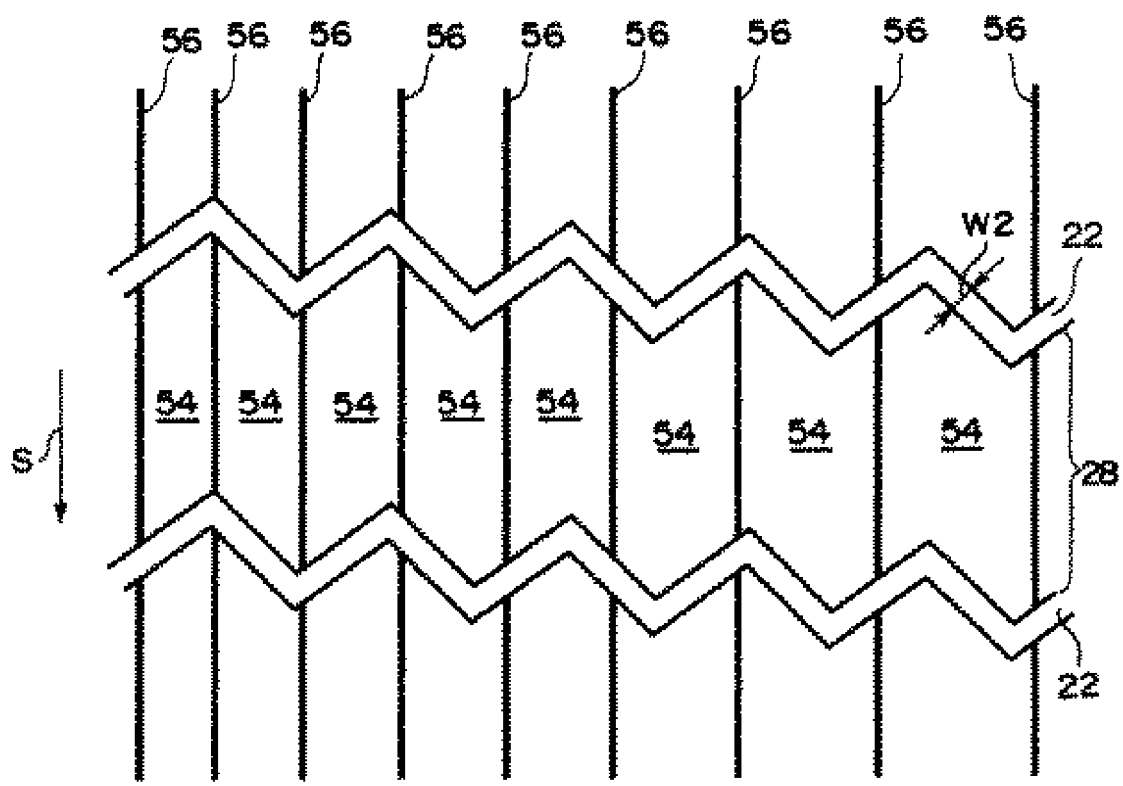
FIG. 14 is a plan view illustrating a partially enlarged portion of the tread of the pneumatic tire according to the third exemplary embodiment of the present invention.

As shown in FIG. 14, zig-zag-shaped sipes 22 which extend to the tire width direction (the direction of the arrow W) are provided onto the tread surface of the blocks 20, and each of the blocks 20 is divided into a plurality of sub-blocks 28 between the main grooves 38 and the sipes 22 or between the sipes 22.

Figure 13B:
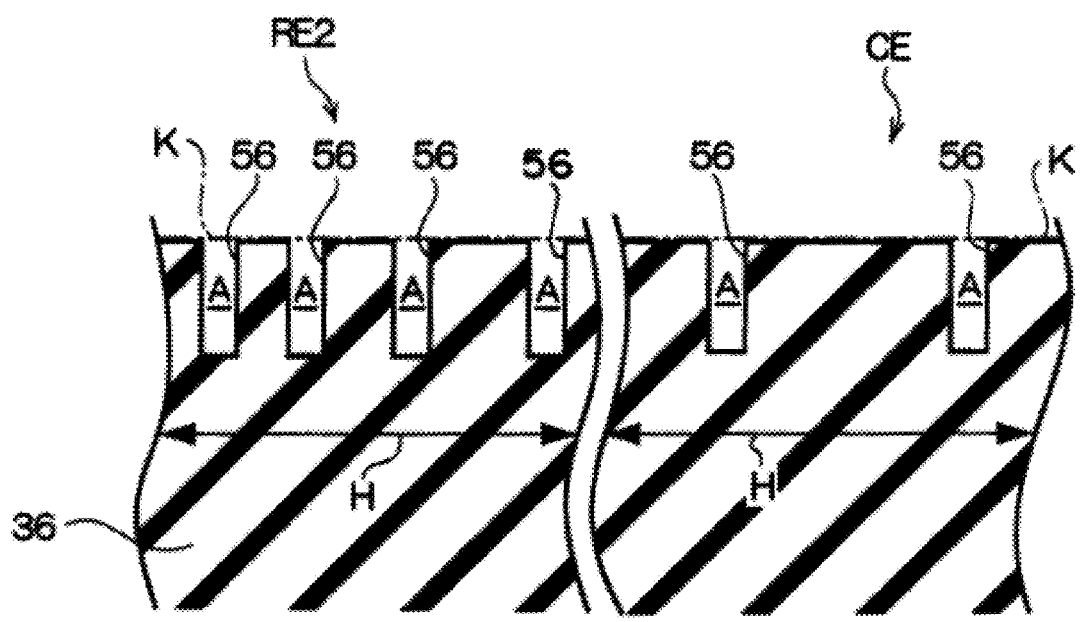
FIG. 13B is a cross-sectional view illustrating an enlarged shallow groove portion in the block of the pneumatic tire according to the third exemplary embodiment of the present invention.

Shallow grooves 56 which absorb water generated between the tread surface of the blocks 20 and a road surface so as to be capable of eliminating or reduce a water film are provided in the tread surfaces of the blocks 20. The shallow grooves 56 in the present exemplary embodiment are formed into a linear shape along the circumferential direction of the pneumatic tire 50. The shallow grooves 56 divide the sub-blocks 28 into minute land sections 54. When the tread ends of the pneumatic tire 50 are designated by E and the boundary portions between the drain main groove 14 and the blocks 20 are designated by K, a interval between forming the shallow grooves 56 is the widest on a middle portion of the tire width direction W between the tread end E and the boundary portion K in the two tread half areas divided by the drain main groove 14. The interval becomes gradually narrower from the middle portion towards the tread ends E and the drain main groove 14. As a result, density of the shallow grooves 56 formed in the tread end areas TE1 and TE2 near the tread ends E and in the land end areas RE1 and RE2 adjacent to the drain main groove 14 is higher than density of the shallow grooves 56 formed in the other areas (hereinafter, "center areas CE"). As a result, as shown in FIG. 13B, the total area of the cross section A of the shallow grooves 56 per unit area H in the cross section in the tire width direction W in the case where the surfaces of the blocks 20 are connected by the continuous virtual surface K is larger at the tread end areas TE1 and TE2 and the land end areas RE1 and RE2 than that at the center areas CE.

The positions of the tread ends E and the ranges of the tread end areas TE1 and TE2 are similar to those in the first exemplary embodiment.

Figure 15:
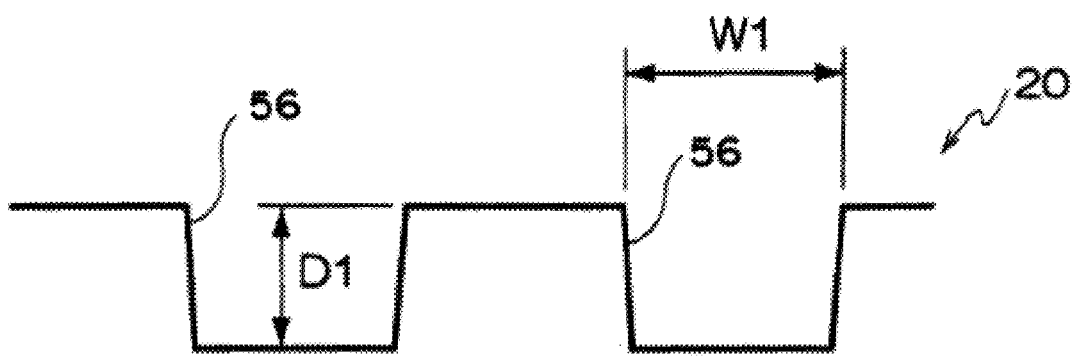
FIG. 15 is an explanatory diagram illustrating a depth and a width of the shallow grooves formed in the tread of the pneumatic tire according to the third exemplary embodiment of the present invention.

As shown in FIG. 15, the width W1 of the shallow grooves 56 is at least narrower than the width W2 (see FIG. 14) of the sipes 22, however, these widths may be equivalent or W1 is wider than W2. The width W1 of the shallow grooves 56 is preferably within a range of 0.1 mm to 1.0 mm. When the width W1 is 1.0 mm or less, a deformation of the minute land sections 30 at the time of grounding is suppressed, and abrasion can be reduced.

As shown in FIG. 15, the shallow grooves 56 have an approximately rectangular cross section, and the depth is preferably within a range of 0.1 mm to 0.5 mm. When the depth D1 and the width W1 are 0.1 mm or more, the amount of water capable of being taken into the shallow grooves 56 is secured, thereby obtaining the high water eliminating effect. When the depth D1 is set to 0.5 mm or less and the width W1 is set to 1.0 mm or less, a deformation of the minute land sections 54 at the time of grounding is suppressed, and abrasion can be reduced.

The area of the tread surface of the minute land section 54 is preferably 0.4 mm² to 30 mm². When the area of the tread surface is 0.4 mm² or more, the grounding area is secured, and the high performance of the pneumatic tire 50 can be obtained in the early stage of use. When the grounding area is limited to 30 mm² or less, the amount of water capable of being taken into the shallow grooves 56 is secured, thereby obtaining the high water eliminating effect.

The shallow grooves 56 can be formed in the inner surface of a mold for vulcanizing and molding the pneumatic tire 50 by cutting work, electrical discharging, etching work and the like.

The shallow grooves 56 can be formed also on molded tires or tires whose surfaces are abraded to a certain extent due to running, and the grooves 56 can be formed on such tires by surface buff and the like using knife cutting or sandpaper.

The function of the pneumatic tire 50 according to the present exemplary embodiment is described below.

The tread 52 of the pneumatic tire 50 includes the inward rubber layer 34 on the inside in the tire radial direction (non-foam rubber layer) and the outward rubber layer 36 on the outside in the tire radial direction (foam rubber layer), however, the air bubbles of the outward rubber layer 36 are not exposed from the tread surface in the early stage of use.

When a vehicle with the pneumatic tires 50 in the early stage of use runs on a snow and ice road, water is generated due to a pressure or friction at the time of contact between the tread 52 and ice or snow. The water which causes a deterioration of the frictional force is taken into the shallow grooves 56 provided to the tread surface of the blocks 20 and is drained via these grooves (or further, via the sipes 22) to the drain main groove 14, the circumferential grooves 16 and the lateral grooves 18 and 24. For this reason, the water film between the tread surface and the road is eliminated.

For this reason, in the pneumatic tire 50 of the present exemplary embodiment, the braking performance and driving performance on the snow and ice road in the early stage of use are further improved than tires where the shallow grooves 56 are not formed in the tread surface. Simultaneously, the wet performance is improved by the drainage effect of the shallow grooves 56 also on wet roads.

Particularly in the present exemplary embodiment, the density of the shallow grooves 56 formed in the tread end areas TE1 and TE2 near the tread ends E and the land end areas RE1 and RE2 adjacent to the drain main groove 14 is higher than the density of the shallow grooves 56 formed in the center areas CE. In normal, the grounding pressure at the land sections adjacent to the drain main groove 14 and near the tread ends E is higher than that in the other portions. Therefore, when the vehicle runs on a snow road, a lot of water is discharged from these portions. Therefore, when the density of the shallow grooves 26 formed in the tread end areas TE1 and TE2 and in the land end areas RE1 and RE2 is enlarged, a lot of water can be absorbed, thereby improving the drainage effect.

Figure 16:
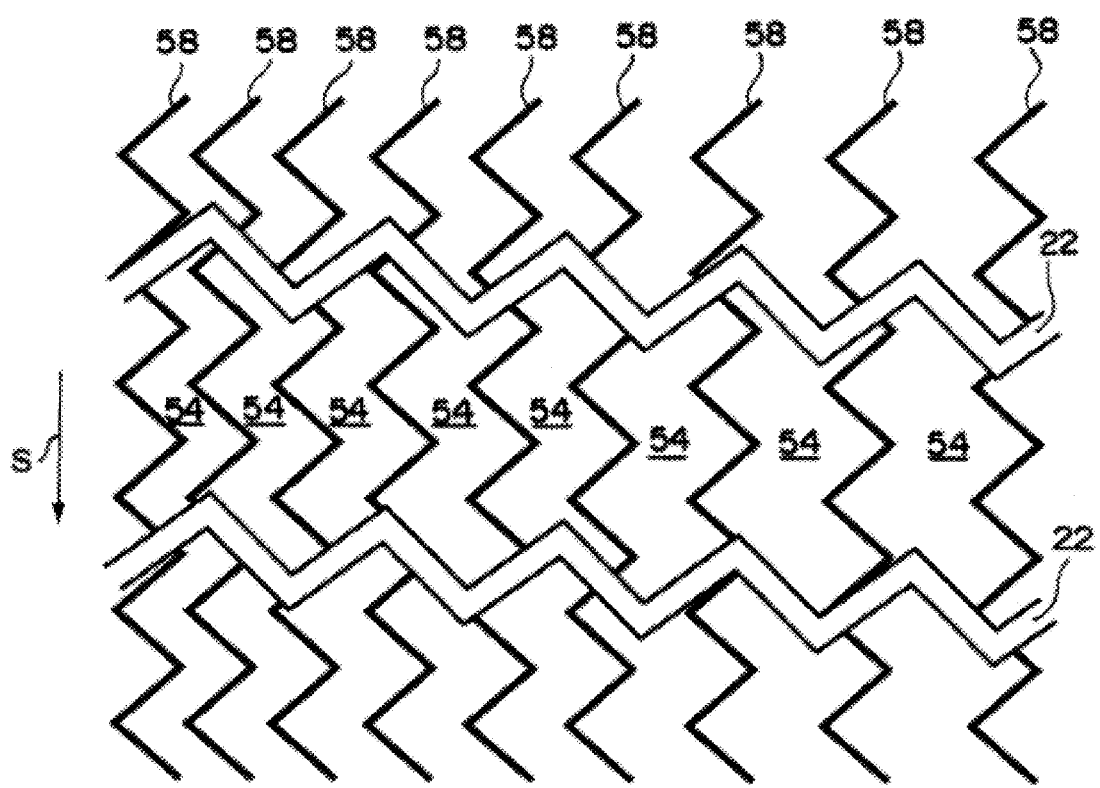
FIG. 16 is an explanatory diagram illustrating the shallow grooves which can be applied to the third exemplary embodiment of the present invention and have a different shape from that shown in FIG. 14.
Figure 17:
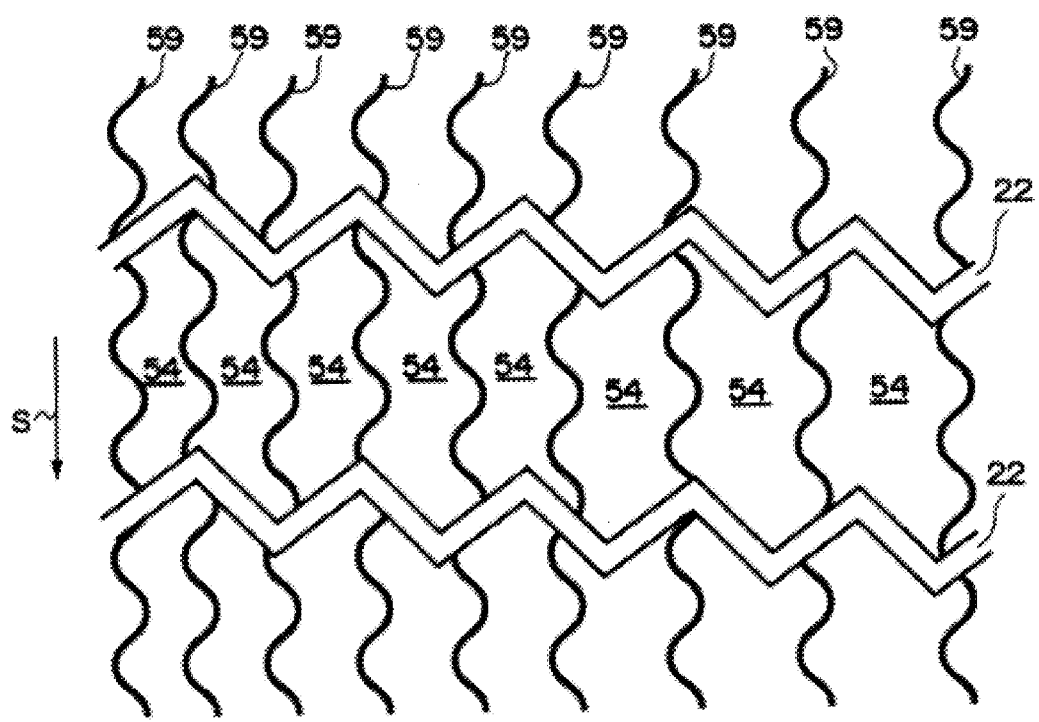
FIG. 17 is an explanatory diagram illustrating the shallow grooves which can be applied to the third exemplary embodiment of the present invention and have a different shape from that shown in FIG. 14.

The shallow grooves of the present invention are not limited to the linear shallow grooves 56, and as shown in FIG. 16, they may be zig-zag-shaped shallow grooves 58 which extend in the tire circumferential direction S, or wave-patterned shallow grooves 59 which extend in the tire circumferential direction.

Figure 18:
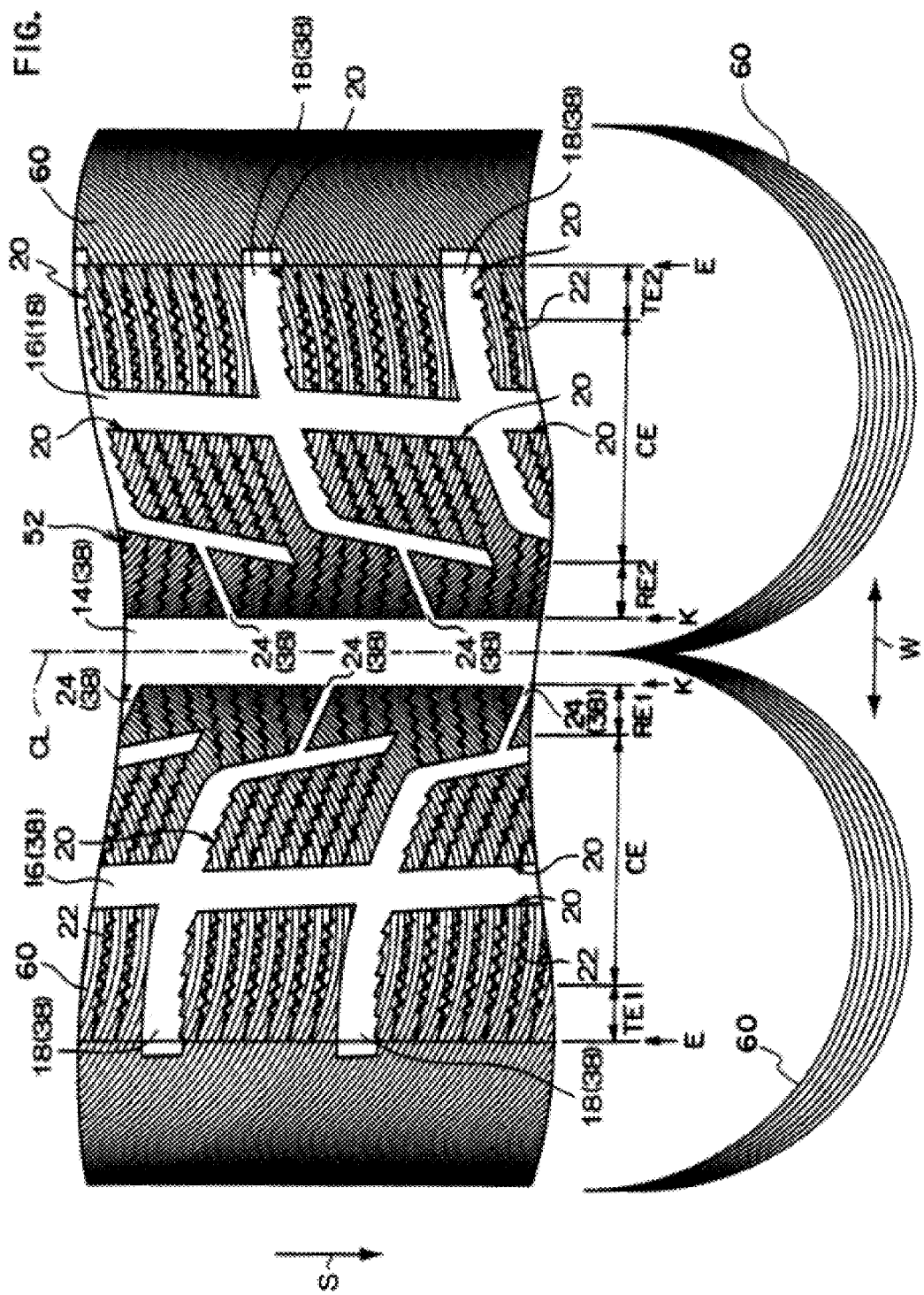
FIG. 18 is a plan view illustrating a modified example of the tread of the pneumatic tire according to the third exemplary embodiment of the present invention.

The shallow grooves of the present invention may be semicircular shallow grooves 60 as shown in FIG. 18. A radius of the semicircular shallow grooves 60 is ¼ of the tread width or longer, and they have an approximately semicircular shape having a convex portion in the tire rotating direction. The semicircular shallow grooves 60 are arranged in the tire circumferential direction S with predetermined intervals, so as to form a semicircular groove group.

When the plurality of semicircular shallow grooves 60 is arranged, the density of the shallow grooves formed in the tread end areas TE and the land end areas RE can be easily made higher than the density of the shallow grooves formed in the center areas CE. Further, when they have the approximately semicircular shape in the tire rotating direction, the drainage can be executed efficiently.

The approximately semicircular shape preferably has a center angle of 120° to 180°.

The radius may be ¼ or more and ½ or less of the tread width. Further, a curvature of the semicircular shallow grooves 60 is preferably 5 mm to 150 mm because of a relationship between the intervals of the drain main grooves and the grounding width in the tire width direction.

The shallow grooves do not have to be always arranged in a regular pattern like the present exemplary embodiment, however, when the pattern is regular, the configuration becomes simple, and the uniform performance can be preferably obtained at the entire tread surface.

areas CE, however, as described in the first exemplary embodiment, the depth of the shallow grooves may be also changed, or as described in the second exemplary embodiment, the angle of the shallow grooves may also be changed. Further, both the depth and the angle of the shallow grooves may be changed.

EXAMPLE 1

The present invention is described in more detail below by examples.

In the example 1, the pneumatic tire 10 of the first exemplary embodiment shown in FIGS. 1 to 5 was mounted to a passenger vehicle, and the on-ice performance in the early stage of use was evaluated. The depth D1 of the shallow grooves 26 was 0.65 mm, and the depth D2 was 0.5 mm.

As a comparative example 1, a tire in which the depth of the shallow grooves 26 are uniform in all the areas and the other conditions are the same as those of the tire 10 was used, and the on-ice performance in the early stage of use was evaluated.

Table 1 shows basic configurations and the evaluations of the on-ice performance of the pneumatic tires in the example 1 and the comparative example 1.

TABLE 1

|  |  | Comparative Example 1 | Example 1 |
|---|---|---|---|
| Configuration of shallow grooves | Basic shape | Linear, inclination at 45° with respect to circumferential direction | Linear, inclination at 45° with respect to circumferential direction |
|  | Width | 0.3 mm | 0.3 mm |
|  | Depth | 0.5 mm (Uniform in Tread width direction) | 0.5 mm (Center areas) 0.65 mm (Tread ends, Land end areas) |
| Area of tread surface on minute convex portion | | Approximately 10 mm$^2$ | Approximately 10 mm$^2$ |
| Rubber of treads | Outward rubber layer | Foam rubber (Foaming percentage: 26%) | Foam rubber (Foaming percentage: 26%) |
|  | Inward rubber layer | Non-foam rubber | Non-foam rubber |
| On-ice performance | On-ice acceleration | 100 | 105 |
|  | Braking distance | 100 | 90 |

The present exemplary embodiment describes the pneumatic tire 50 where the sipes 22 are formed in the blocks 20, however, the present invention can be applied to pneumatic tires where the sipes 22 are not formed, and the shallow grooves 56 can be formed in the blocks 20. In this case, when the shallow grooves are made shallower and narrower than the drain main grooves 14 and 16 and the lateral grooves 18 and 24, the influence of the shallow grooves 56 to be exerted on the basic performance of the pneumatic tire can be reduced, and the water eliminating effect which is an original effect of the shallow grooves 56 can be maintained.

Not only the pneumatic tire 50 where the blocks 20 are formed by the main grooves 38, however, also pneumatic tires where, for example, ribs are formed can be the pneumatic tire of the present invention by forming the shallow grooves in the ribs.

The blocks 20 (or ribs) may be formed by rubber which is filled with filler in order to improve an on-ice performance instead of the outward rubber layer composed of the foam rubber layer. With such a configuration, it is assumed that the filler is not exposed from the tread surface of the pneumatic tire in the early stage of use, however, when the shallow grooves of the present exemplary embodiment are formed, the performance of the pneumatic tire in the early stage of use can be improved.

In the present exemplary embodiment, only the density of the shallow grooves 46 is changed at the tread end areas TE1 and TE2, the land end areas RE1 and RE2, and the center In the example 1 and the comparative example 1, the common conditions are as follow:

Tire size: 195/65R16

Usage Rim: 6J-15

Usage inner pressure: 210 kPa (Equal at front and rear)

<Experiment Method and Evaluation Method>

On-Ice Acceleration

The time required for acceleration from 5 km/h to 15 km/h on ice was measured, and the example 1 was relatively evaluated at index number in the case of 100 in the comparative example 1. A larger value indicates that the acceleration performance is more excellent.

Braking Distance

The braking distance required for deceleration to 0 km/h by means of a braking lock during running on ice at constant speed of 20 km/h was measured, and the example 1 was relatively evaluated at index number in the case of 100 in the comparative example 1. A smaller value indicates that the braking performance is more excellent.

According to Table 1, it is found that both the acceleration performance and braking performance are more excellent in the example 1 than those in the comparative example 1. This is because the depth of the shallow grooves 26 of the example 1 was made larger in the tread end areas TE1 and TE2 and the land end areas RE1 and RE2 than that of the comparative example 1.

EXAMPLE 2

In the example 2, the pneumatic tire 40 of the second exemplary embodiment shown in FIGS. 7 to 10 was mounted to a passenger vehicle, and the on-ice performance in the early stage of use was evaluated. The angle θ1 of the shallow grooves 26 was set to 15°, and the angle θ2 was set to 45°.

Figure 19:
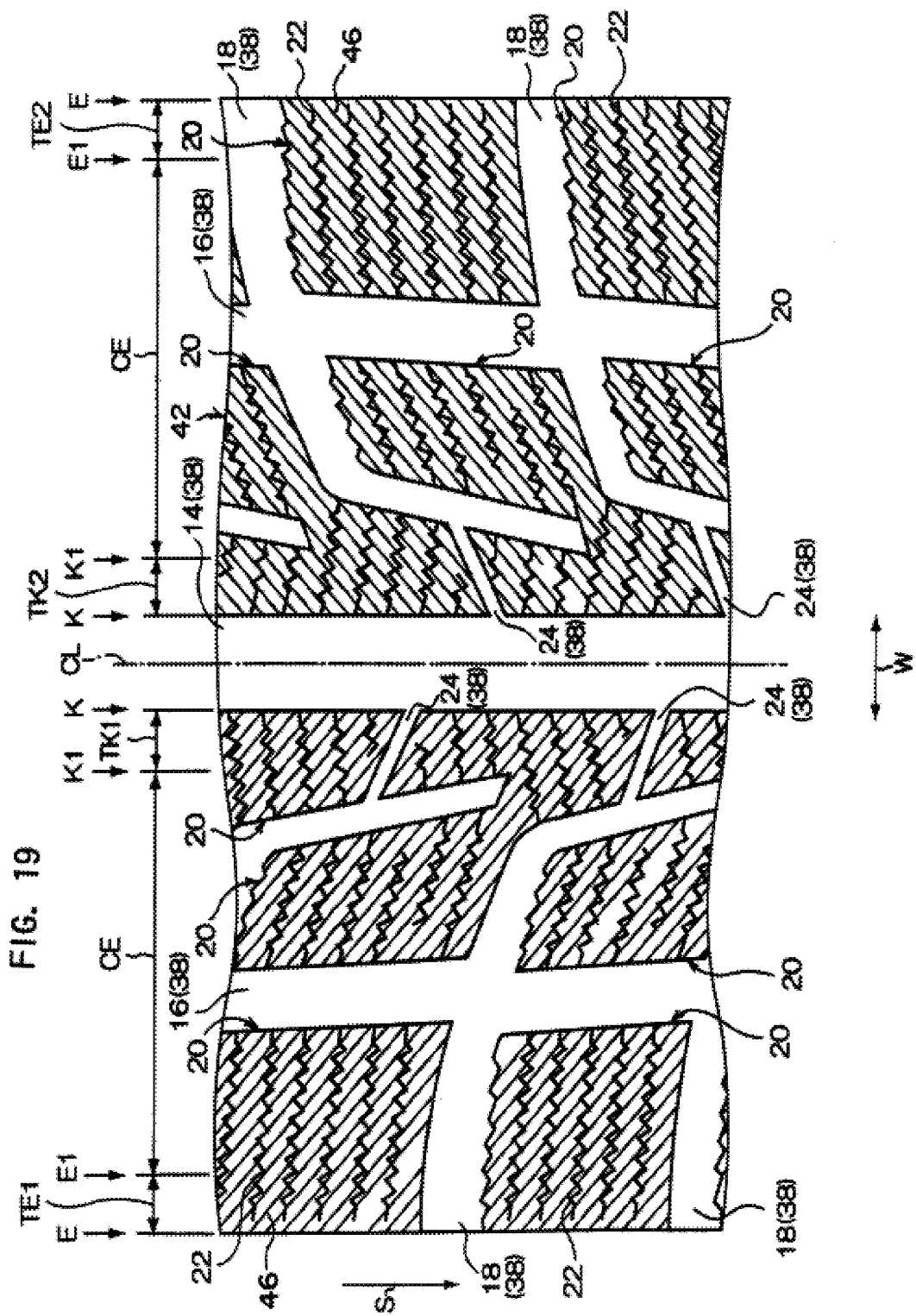
FIG. 19 is a plan view illustrating the tread of the pneumatic tire of a comparative example 2.

As a comparative example 2, tires, in which all the angles of inclination of the shallow grooves 46 with respect to the tire circumferential direction were set to 45° (see FIG. 19) and the other conditions were the same as those of the pneumatic tire 40, were used, and the on-ice performance in the early stage of use was evaluated.

Table 2 shows basic configurations and the evaluations of the on-ice performance of the pneumatic tires in the example 2 and the comparative example 2.

According to Table 2, it is found that both the acceleration performance and braking performance on ice are more excellent in the example 2 than those in the comparative example 2. This is because the angle of inclination of the shallow grooves with respect to the tire circumferential direction in the tread end areas TE1 and TE2 and the land end areas RE1 and RE2 are made smaller in the example 2 than the angle of inclination of the shallow grooves 26 with respect to the tire circumferential direction in the comparative example 2.

EXAMPLE 3

In the example 3, the pneumatic tire 10 of the third exemplary embodiment shown in FIGS. 12 to 15 was mounted to a passenger vehicle, and the on-ice performance in the early stage of use was evaluated. The area of the minute land

TABLE 2

| | | Comparative Example 2 | Example 2 |
|---|---|---|---|
| Configuration of shallow grooves | Basic shape | Linear, inclination at 45° with respect to circumferential direction | Linear, inclination at 15° with respect to circumferential direction in tread end areas and land end areas, Inclination at 45° in the other areas |
| | Width | 0.3 mm | 0.3 mm |
| | Depth | 0.5 mm | 0.5 mm |
| Area of tread surface on minute convex portion | | Approximately 20 mm$^2$ | Approximately 20 mm$^2$ |
| Rubber of treads | Outward rubber layer | Foam rubber (Foaming percentage: 26%) | Foam rubber (Foaming percentage: 26%) |
| | Inward rubber layer | Non-foam rubber | Non-foam rubber |
| On-ice performance | On-ice acceleration | 100 | 105 |
| | Braking distance | 100 | 90 |

In the example 2 and the comparative example 2, the common conditions are as follows:
Tire size: 195/65R16
Usage rim: 6J-15
Usage inner pressure: 210 kPa (Equal at front and rear)
<Experimental Method and Evaluation Method>
On-Ice Acceleration The time required for acceleration from 5 km/h to 15 km/h on ice was measured, and the example 2 was relatively evaluated at index number in the case of 100 in the comparative example 2. A larger value indicates that the acceleration performance is more excellent.

Braking Distance

The braking distance required for deceleration to 0 km/h during running on ice at constant speed of 20 km/h was measured, and the example 2 was relatively evaluated at index number in case of 100 in the comparative example 2. A smaller value indicates that the braking performance is more excellent.

section 54 of the pneumatic tire 50 was 1 to 10 mm$^2$ at the tread end areas TE1 and TE2 and the land end areas RE1 and RE2, and about 10 mm$^2$ at the center areas CE.

Figure 20:
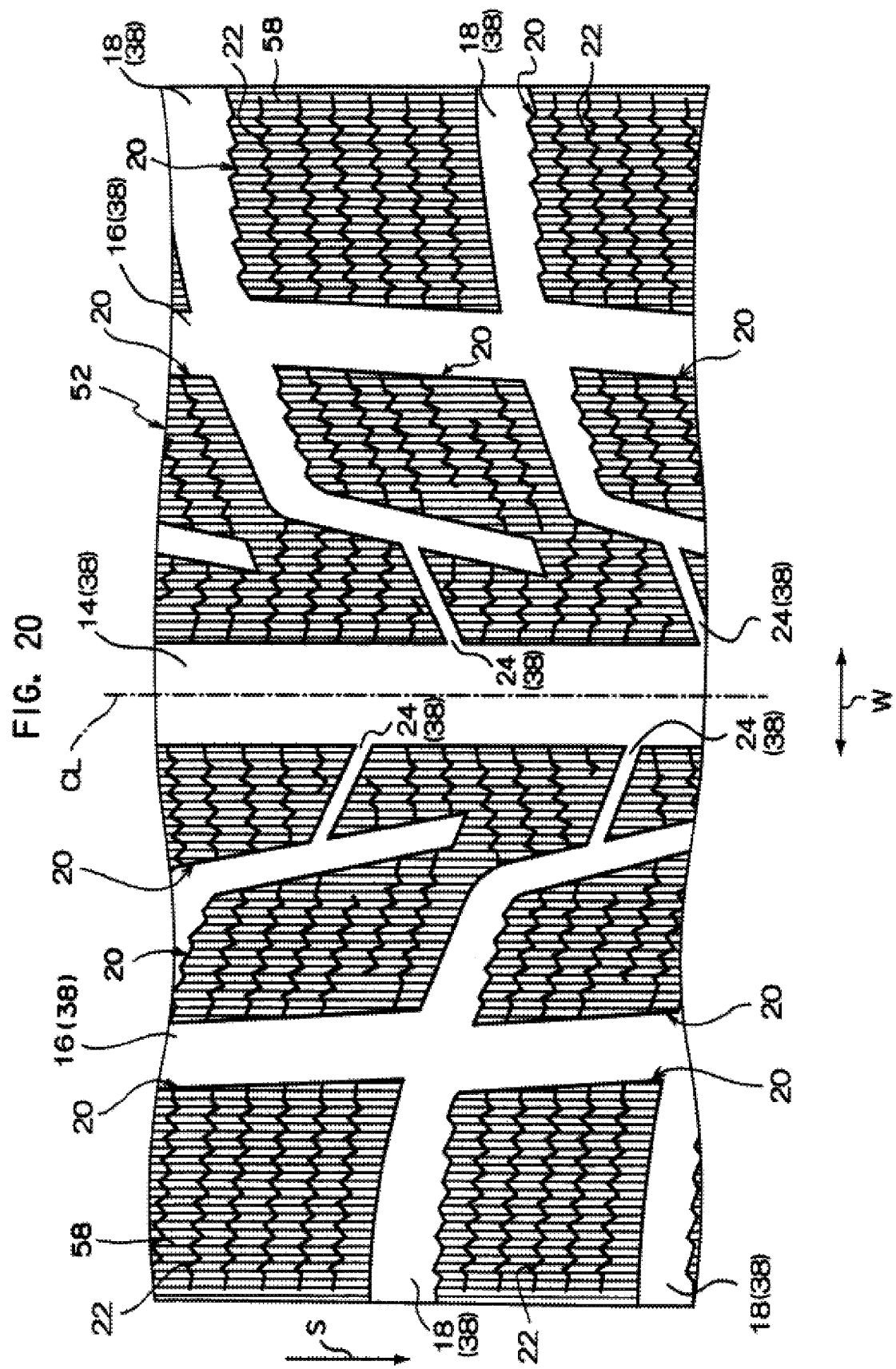
FIG. 20 is a plan view illustrating the tread of the pneumatic tire of a comparative example 3.

As a comparative example 3, the pneumatic tire shown in FIG. 20 was used, and the on-ice performance in the early stage of use was evaluated. The linear shallow grooves 58 are formed at equal intervals along the tire circumferential direction S, and the area of the minute land section 54 is 10 mm$^2$. The basic configurations of the example and the comparative example are the same as each other except for the different intervals of the shallow grooves, and in FIG. 20, the same portions are designated by the same reference numerals in FIG. 12.

Table 3 shows basic configurations and the evaluations of the on-ice performance of the pneumatic tires in the example 3 and the comparative example 3.

TABLE 3

| | | Comparative Example 3 | Example 3 |
|---|---|---|---|
| Configuration of shallow grooves | Basic shape | Linear, parallel in circumferential direction | Linear, Parallel in circumferential direction |
| | Density | Minute land portions about 10 mm$^2$ | Minute land portions gradually increase by 1 mm$^2$ to 10 mm$^2$. |
| | Width | 0.3 mm | 0.3 mm |
| | Depth | 0.2 mm | 0.2 mm |
| Area of tread surface on minute convex portion | | Approximately 10 mm$^2$ | 1 to 10 mm$^2$ |
| Rubber of treads | Outward rubber layer | Foam rubber (Foaming percentage: 26%) | Foam rubber (Foaming percentage: 26%) |
| | Inward rubber layer | Non-foam rubber | Non-foam rubber |
| On-ice performance | On-ice acceleration | 100 | 103 |
| | Braking distance | 100 | 95 |

In the example 3 and the comparative example 3, the common conditions are as follows:
Tire size: 195/65R16
Usage rim: 6J-15
Usage inner pressure: 210 kPa (Equal at front and rear)
<Experimental Method and Evaluation Method>
On-Ice Acceleration The time required for acceleration from 5 km/h to 15 km/h on ice was measured, and the example 3 was relatively evaluated at index number in the case of 100 in the comparative example 3. A larger value indicates that the acceleration performance is more excellent.

Braking Distance

The braking distance required for deceleration to 0 km/h during running on ice at constant speed of 20 km/h was measured, and the example 3 was relatively evaluated at index number in case of 100 in the comparative example 3. A smaller value indicates that the braking performance is more excellent.

According to Table 3, it is found that both the acceleration performance and braking performance on ice are more excellent in the example 3 than those in the comparative example 3. This is because the density of formation of the shallow grooves 26 in the tread end areas TE1 and TE2 and the land end areas RE1 and RE2 are made larger in the example 3 than those in the comparative example 3.

INDUSTRIAL APPLICABILITY

Explanation of Reference Numerals

| | |
|---|---|
| 10, 40, 50: | pneumatic tire |
| 14: | drain main groove |
| 16: | circumferential groove |
| 18, 24: | lateral groove |
| 20: | block |
| 22: | sipe |
| 26, 46, 56, 58, 59: | shallow groove |
| 28: | sub-block |
| 30, 44, 54: | minute land section |
| 38: | main groove |

The invention claimed is:

1. A pneumatic tire comprising a plurality of land sections divided by a plurality of main grooves in a tread surface and in which the land sections are divided by at least one sipe extending in a tire width direction so that sub-blocks are formed, wherein
at least one of the plurality of main grooves is a drain main groove that is principally a drain groove,
a plurality of shallow grooves which are shallower than the sipe are formed in the land sections, and
a total sectional area of the shallow grooves per unit area in a cross section of the tire width direction, in at least one of tread end areas arranged at end sides of the tread surface in the tire width direction or land end areas adjacent to the drain main groove of the land sections, is larger than the total sectional area of the cross section of the shallow grooves per unit area in other areas of the tread surface,
wherein an average depth of the shallow grooves in at least one of the tread end areas or the land end areas is deeper than an average depth of the shallow grooves in the other areas.

2. The pneumatic tire of claim 1, wherein
the drain main groove is a center circumferential groove formed along the tire circumferential direction at a center portion of the tread surface in the tire width direction, and
the average depth of the shallow grooves is the same in the tread end areas and the land end areas which are arranged at both sides of the center circumferential groove.

3. The pneumatic tire of claim 1, wherein a difference between the average depth of the shallow grooves formed in the tread end areas and the land end areas, and the average depth of the shallow grooves formed in the other areas is 0.1 mm to 0.4 mm.

4. The pneumatic tire of claim 1, wherein an angle of inclination of the shallow grooves with respect to the tire circumferential direction in at least one of the tread end areas or the land end areas is smaller than an inclination angle of the shallow grooves with respect to the tire circumferential direction in the other areas.

5. The pneumatic tire of claim 4, wherein the angle of inclination of the shallow grooves with respect to the tire circumferential direction increases gradually with distance from the tread ends of the tread surface, and from the drain main groove.

6. The pneumatic tire of claim 4, wherein a difference between the angle of inclination of the shallow grooves formed in the tread end areas and the land end areas with respect to the tire circumferential direction, and the angle of inclination of the shallow grooves formed in the other areas with respect to the tire circumferential direction, is 2° to 60°.

7. The pneumatic tire of claim 1, wherein a density of formation of the shallow grooves in at least one of the tread end areas or the land end areas is greater than a density of formation of the shallow grooves in the other areas.

8. The pneumatic tire of claim 7, wherein the density of formation of the shallow grooves is at a minimum in middle portions between center circumferential grooves of the tread surface and both the tread ends, and increases gradually towards the tread ends and towards the center circumferential grooves.

9. The pneumatic tire of claim 7, wherein
the drain main groove is a center circumferential groove formed along the tire circumferential direction at the center portion of the tread surface in the tire width direction, and
the density of formation of the shallow grooves is the same in the tread end areas and in the land end areas arranged at both sides of the center circumferential groove.

10. The pneumatic tire of claim 7, wherein the shallow grooves are formed in a linear shape along the tire circumferential direction, and intervals between forming the shallow grooves in at least one of the tread end areas or the land end areas are smaller than intervals between forming the shallow grooves in the other areas.

11. The pneumatic tire of claim 7, wherein the shallow grooves include a semicircular groove group which is configured by arranging a plurality of semicircular shallow grooves in the tire circumferential direction, the semicircular shallow grooves being formed on each half of the tread areas on both sides sandwiching the center circumferential groove, with a radius ¼ of the tread width or greater and having an approximately semicircular shape with a convex portion in a tire rotating direction.

12. The pneumatic tire of claim 11, wherein a curvature radius of the semicircular shallow grooves is 5 mm to 150 mm.

13. The pneumatic tire of claim 1, wherein the shallow grooves have a depth of 0.1 mm to 0.5 mm and a width of 0.1 mm to 1.0 mm.

14. The pneumatic tire of claim 1, wherein a plurality of minute land sections divided by the plurality of shallow grooves have a tread surface area of 0.4 mm² to 30 mm².

15. The pneumatic tire of claim 1, wherein rubber forming the land sections is comprised of a foam rubber layer on an outside in a tire radial direction and a non-foam rubber layer on an inside in the radial direction.

* * * * *